United States Patent
Zhu et al.

(10) Patent No.: US 10,313,424 B2
(45) Date of Patent: Jun. 4, 2019

(54) CLOUD APPLICATION PROCESSING METHOD, CLOUD APPLICATION DEPLOYMENT METHOD, AND RELATED APPARATUS AND SYSTEM

(71) Applicant: Huawei Technologies Co., Ltd., Shenzhen (CN)

(72) Inventors: Jie Zhu, Shenzhen (CN); Yi Zhang, Shenzhen (CN); Jin Qin, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 274 days.

(21) Appl. No.: 15/331,509

(22) Filed: Oct. 21, 2016

(65) Prior Publication Data

US 2017/0041379 A1   Feb. 9, 2017

Related U.S. Application Data

(63) Continuation of application No. PCT/CN2014/076057, filed on Apr. 23, 2014.

(51) Int. Cl.
*G06F 15/16* (2006.01)
*H04L 29/08* (2006.01)
(Continued)

(52) U.S. Cl.
CPC .......... *H04L 67/06* (2013.01); *G06F 9/5083* (2013.01); *G06F 9/5088* (2013.01);
(Continued)

(58) Field of Classification Search
CPC ..... H04L 12/4641; H04L 67/06; H04L 67/10; H04L 67/20; H04L 67/38; H04L 67/1097;
(Continued)

(56) References Cited

U.S. PATENT DOCUMENTS

| | | | |
|---|---|---|---|
| 2010/0058342 A1 | 3/2010 | Machida | |
| 2011/0022812 A1* | 1/2011 | van der Linden | .... G06F 9/5077 711/163 |

(Continued)

FOREIGN PATENT DOCUMENTS

| | | |
|---|---|---|
| CN | 101883029 A | 11/2010 |
| CN | 103197952 A | 7/2013 |

(Continued)

OTHER PUBLICATIONS

Machine Translation and Abstract of Japanese Publication No. JP2006185152, Jul. 3, 2006, 35 pages.

(Continued)

*Primary Examiner* — Frantz B Jean
(74) *Attorney, Agent, or Firm* — Conley Rose, P.C.

(57) ABSTRACT

A cloud application processing method and related apparatus are provided. The method is performed by a cloud service provider, and may include determining that a working state of a first virtual machine satisfies a condition for adding a virtual machine, determining, according to an emergency policy corresponding to a first application running on the first virtual machine, a second application that has an emergency relationship with the first application, and instructing a second virtual machine on which the second application is hosted to run the first application deployed on the second virtual machine, creating a third virtual machine, deploying and starting the first application on the third virtual machine, and instructing the second virtual machine to stop running the first application after the first application is started on the third virtual machine.

12 Claims, 9 Drawing Sheets

(51) Int. Cl.
*G06F 9/50* (2006.01)
*H04L 29/14* (2006.01)
*H04L 29/06* (2006.01)
*H04L 12/46* (2006.01)
*G06F 9/455* (2018.01)

(52) U.S. Cl.
CPC .......... *H04L 12/4641* (2013.01); *H04L 67/10* (2013.01); *H04L 67/1097* (2013.01); *H04L 67/20* (2013.01); *H04L 67/38* (2013.01); *H04L 69/40* (2013.01); *G06F 2009/4557* (2013.01); *G06F 2009/45562* (2013.01)

(58) Field of Classification Search
CPC ................... H04L 69/40; G06F 9/5088; G06F 2009/4557; G06F 9/5083; G06F 2009/45562
USPC .......................................................... 709/219
See application file for complete search history.

(56) References Cited

U.S. PATENT DOCUMENTS

| | | | |
|---|---|---|---|
| 2011/0154332 A1 | 6/2011 | Shirae et al. | |
| 2011/0167421 A1 | 7/2011 | Soundararajan et al. | |
| 2012/0254443 A1* | 10/2012 | Ueda ................... | H04L 67/1008 709/226 |

FOREIGN PATENT DOCUMENTS

| | | |
|---|---|---|
| CN | 103634128 A | 3/2014 |
| JP | 2006185152 A | 7/2006 |
| JP | 2011134010 A | 7/2011 |
| JP | 2012208781 A | 10/2012 |
| WO | 2008084826 A1 | 7/2008 |

OTHER PUBLICATIONS

Foreign Communication From A Counterpart Application, Japanese Application No. 2016-564029, Japanese Office Action dated Oct. 3, 2017, 3 pages.
Foreign Communication From A Counterpart Application, Japanese Application No. 2016-564029, English Translation of Japanese Office Action dated Oct. 3, 2017, 3 pages.
Machine Translation and Abstract of Japanese Publication No. JP2012208781, Oct. 25, 2012, 20 pages.
Foreign Communication From A Counterpart Application, Japanese Application No. 2016-564029, Japanese Office Action dated Jan. 16, 2018, 3 pages.
Partial English Translation and Abstract of Chinese Patent Application No. CN103634128, Mar. 12, 2014, 7 pages.
Chieu, T., et al., "Dynamic Scaling of Web Applications in Virtualized Cloud Computing Enviroment," IEEE International Conference on e-Buisness Engineering, Oct. 21, 2009, pp. 281-286.
Foreign Communication From A Counterpart Application, European Application No. 14890207.5, Extended European Search Report dated Mar. 10, 2017, 10 pages.
Foreign Communication From A Counterpart Application, PCT Application No. PCT/CN2014/076057, English Translation of International Search Report dated Jan. 23, 2015, 2 pages.
Foreign Communication From A Counterpart Application, PCT Application No. PCT/CN2014/076057, English Translation of Written Opinion dated Jan. 23, 2015, 7 pages.

* cited by examiner

CLOUD APPLICATION PROCESSING METHOD, CLOUD APPLICATION DEPLOYMENT METHOD, AND RELATED APPARATUS AND SYSTEM

CROSS-REFERENCE TO RELATED APPLICATIONS

This application is a continuation of International Patent Application No. PCT/CN2014/076057, filed on Apr. 23, 2014, the disclosure of which is hereby incorporated by reference in its entirety.

TECHNICAL FIELD

The present disclosure relates to the field of communications technologies, and in particular, to a cloud application processing method, a cloud application deployment method, a related apparatus, and a cloud service system.

BACKGROUND

A cloud computing service in a broad sense may be regarded as a service delivery and consumption mode.

A cloud service provider (CSP) connects a large quantity of computing resources using a network and performs unified management, allocation and scheduling, and the computing resources constitute a huge computing resource pool to provide services for cloud service consumers (CSC). For the CSCs, cloud resources may be infinitely expanded and have characteristics of high efficiency and flexibility, for example, request on demand and payment per use.

Platform as a service (PaaS) is a common service mode of broad-sense cloud computing. PaaS provides a middleware platform (covering a database, an application server, and the like) for a user as a service, where the middleware platform is developed in a customized manner. Essentially, PaaS converts a resource service of the Internet into a programmable interface, to provide a third-party developer with a resource and service platform that has a commercial value. With support of a PaaS platform, a cloud computing developer obtains a large quantity of programmable elements. These programmable elements have specific service logic, which brings great convenience to development, not only improving development efficiency but also reducing development costs.

In the prior art, a user may deploy an application on a virtual machine managed by a CSP server, and the CSP server (for example, AMAZON EC2) performs duplication to obtain several identical standby virtual machines (with the same application installed and in a ready-to-run state). The CSP server starts a standby virtual machine to undertake the corresponding load together with the currently running virtual machine when load of a running virtual machine reaches a threshold set in a resilient policy. However, in the prior art, standby virtual machine resources are directly requested when an application is deployed, resulting in a low utilization rate of virtual machine resources.

SUMMARY

Embodiments of the present disclosure provide a cloud application processing method, a cloud application deployment method, a related apparatus, and a cloud service system to improve a utilization rate of virtual machine resources.

A first aspect of the present disclosure provides a CSP server, which may include a determining unit configured to determine that a working state of a first virtual machine satisfies a condition for adding a virtual machine, an emergency unit configured to determine, according to a determining result of the determining unit, and an emergency policy corresponding to a first application running on the first virtual machine, a second application that has an emergency relationship with the first application, and instruct a second virtual machine on which the second application is hosted to run the first application deployed on the second virtual machine, a creation unit configured to create a third virtual machine according to the determining result of the determining unit, and deploy and start the first application on the third virtual machine, and a stop unit configured to instruct the second virtual machine to stop running the first application after the first application is started on the third virtual machine.

With reference to the first aspect, in a first possible implementation manner of the first aspect, the CSP server further includes a receiving unit configured to receive an application deployment request before the second application that has an emergency relationship with the first application is determined, where the application deployment request carries the emergency policy corresponding to the first application, and the emergency policy corresponding to the first application describes that the first application and the second application have an emergency relationship.

With reference to the first possible implementation manner of the first aspect, in a second possible implementation manner of the first aspect, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other, and the CSP server further includes a deployment unit configured to deploy, on the second virtual machine, the third application that has a host-on relationship with the first application before the second virtual machine on which the second application is hosted is instructed to run the first application deployed on the second virtual machine.

With reference to the first aspect, or the first possible implementation manner of the first aspect, or the second possible implementation manner of the first aspect, in a third possible implementation manner of the first aspect, the emergency policy includes an emergency trigger condition. The emergency trigger condition includes that a quantity of idle resources of the second virtual machine is greater than or equal to a minimum quantity of resources required to run the first application on the second virtual machine, and that the emergency unit instructs the second virtual machine on which the second application is hosted to run the first application deployed on the second virtual machine further includes when determining, according to a running state of the second virtual machine, that the emergency trigger condition is satisfied, instructing the second virtual machine on which the second application is hosted to run the first application deployed on the second virtual machine.

With reference to the first aspect, or the first possible implementation manner of the first aspect, or the second possible implementation manner of the first aspect, or the third possible implementation manner of the first aspect, in a fourth possible implementation manner of the first aspect, before instructing the second virtual machine on which the second application is hosted to run the first application deployed on the second virtual machine, the emergency unit is further configured to determine that the second virtual machine has sufficient idle resources for deploying the first application, and deploy the first application on the second virtual machine.

A second aspect of the present disclosure provides a cloud service client, which may include a generation unit configured to generate an application deployment request, and a sending unit configured to send the application deployment request to a CSP server, where the application deployment request carries a node template corresponding to a first application and a node template corresponding to a second application, where the node template corresponding to the first application includes an emergency policy corresponding to the first application, and the emergency policy corresponding to the first application describes that the first application and the second application have an emergency relationship.

With reference to the second aspect, in a first possible implementation manner of the second aspect, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other.

A third aspect of the present disclosure provides a CSP server, which may include a processor and a memory, where by calling code in the memory, the processor is configured to determine that a working state of a first virtual machine satisfies a condition for adding a virtual machine, determine, according to an emergency policy corresponding to a first application running on the first virtual machine, a second application that has an emergency relationship with the first application, and instruct a second virtual machine on which the second application is hosted to run the first application deployed on the second virtual machine, create a third virtual machine, and deploy and start the first application on the third virtual machine, and instruct the second virtual machine to stop running the first application after the first application is started on the third virtual machine.

With reference to the third aspect, in a first possible implementation manner of the third aspect, the condition for adding a virtual machine includes at least one of the following conditions, a resource utilization rate of the first virtual machine exceeds a first threshold, a throughput per unit time of the first application running on the first virtual machine exceeds a second threshold, or a response latency of the first application running on the first virtual machine exceeds a third threshold.

With reference to the third aspect or the first possible implementation manner of the third aspect, in a second possible implementation manner of the third aspect, by calling the code in the memory, the processor is further configured to receive an application deployment request before determining the second application that has an emergency relationship with the first application, where the application deployment request carries the emergency policy corresponding to the first application, and the emergency policy corresponding to the first application describes that the first application and the second application have an emergency relationship.

A fourth aspect of the present disclosure provides a cloud service client, including a processor and a memory, where by calling a code in the memory, the processor is configured to generate an application deployment request, and send the application deployment request to a CSP server, where the application deployment request carries a node template corresponding to a first application and a node template corresponding to a second application, where the node template corresponding to the first application includes an emergency policy corresponding to the first application, and the emergency policy corresponding to the first application describes that the first application and the second application have an emergency relationship.

With reference to the fourth aspect, in a first possible implementation manner of the fourth aspect, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other.

A fifth aspect of the present disclosure provides a cloud application processing method, which may include determining, by a CSP server, that a working state of a first virtual machine satisfies a condition for adding a virtual machine, determining, according to an emergency policy corresponding to a first application running on the first virtual machine, a second application that has an emergency relationship with the first application, and instructing a second virtual machine on which the second application is hosted to run the first application deployed on the second virtual machine, creating a third virtual machine, and deploying and starting the first application on the third virtual machine, and instructing the second virtual machine to stop running the first application after the first application is started on the third virtual machine.

With reference to the fifth aspect, in a first possible implementation manner of the fifth aspect, the condition for adding a virtual machine includes at least one of the following conditions, a resource utilization rate of the first virtual machine exceeds a first threshold, a throughput per unit time of the first application running on the first virtual machine exceeds a second threshold, or a response latency of the first application running on the first virtual machine exceeds a third threshold.

With reference to the fifth aspect or the first possible implementation manner of the fifth aspect, in a second possible implementation manner of the fifth aspect, before determining, according to an emergency policy corresponding to a first application running on the first virtual machine, a second application that has an emergency relationship with the first application, the method further includes receiving, by the CSP server, an application deployment request, where the application deployment request carries the emergency policy corresponding to the first application, and the emergency policy corresponding to the first application describes that the first application and the second application have an emergency relationship.

With reference to the second possible implementation manner of the fifth aspect, in a third possible implementation manner of the fifth aspect, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other, and before instructing a second virtual machine on which the second application is hosted to run the first application deployed on the second virtual machine, the method further includes deploying, by the CSP server, on the second virtual machine, the third application that has a host-on relationship with the first application.

With reference to the second possible implementation manner of the fifth aspect or the third possible implementation manner of the fifth aspect, in a fourth possible implementation manner of the fifth aspect, the emergency policy further includes an emergency trigger condition, and before instructing a second virtual machine on which the second application is hosted to run the first application deployed on the second virtual machine, the method further includes determining, according to a running state of the second virtual machine, that the emergency trigger condition is satisfied, where the emergency trigger condition includes that a quantity of idle resources of the second virtual machine is greater than or equal to a minimum quantity of resources required to run the first application on the second virtual machine.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, in a fifth possible implementation manner of the fifth aspect, before instructing a second virtual machine on which the second application is hosted to run the first application deployed on the second virtual machine, the method further includes determining that the second virtual machine has sufficient idle resources for deploying the first application, and deploying the first application on the second virtual machine.

A sixth aspect of the present disclosure provides a cloud application deployment method, which may include generating an application deployment request, and sending the application deployment request to a CSP server, where the application deployment request carries a node template corresponding to a first application and a node template corresponding to a second application, where the node template corresponding to the first application includes an emergency policy corresponding to the first application, and the emergency policy corresponding to the first application describes that the first application and the second application have an emergency relationship.

With reference to the sixth aspect, in a first possible implementation manner of the sixth aspect, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other.

A seventh aspect of the present disclosure provides a computer storage medium, where the computer storage medium stores a program, where some or all of the steps of any cloud application processing method provided in the embodiments of the present disclosure are included when the program is executed.

An eighth aspect of the present disclosure provides a computer storage medium, where the computer storage medium stores a program, where some or all of the steps of any cloud application deployment method provided in the embodiments of the present disclosure are included when the program is executed.

It may be seen that, in the solutions of the embodiments of the present disclosure, an emergency policy between a first application and a second application is introduced, and based on the emergency policy, it may be implemented that a second virtual machine temporarily lends a resource to a first virtual machine. Therefore, a new virtual machine may be created only when a working state of the first virtual machine satisfies a condition for adding a virtual machine. Compared with the prior-art mechanism in which a standby virtual machine is created in advance when an application is deployed, the solutions of the embodiments of the present disclosure help improve a utilization rate of virtual machine resources because no standby virtual machine needs to be created in advance. Moreover, a temporary resource lending mechanism between virtual machines is introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Embodiments of the present disclosure provide a cloud application processing method, a cloud application deployment method, a related apparatus, and a cloud service system to improve a utilization rate of virtual machine resources. The following provides detailed descriptions using specific embodiments.

To make the disclosure objectives, features, and advantages of the present disclosure clearer and more comprehensible, the following clearly describes the technical solutions in the embodiments of the present disclosure with reference to the accompanying drawings in the embodiments of the present disclosure. The embodiments described in the following are merely a part rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "including", "having", or any other variant thereof, are intended to cover a non-exclusive inclusion. For example, a procedure, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
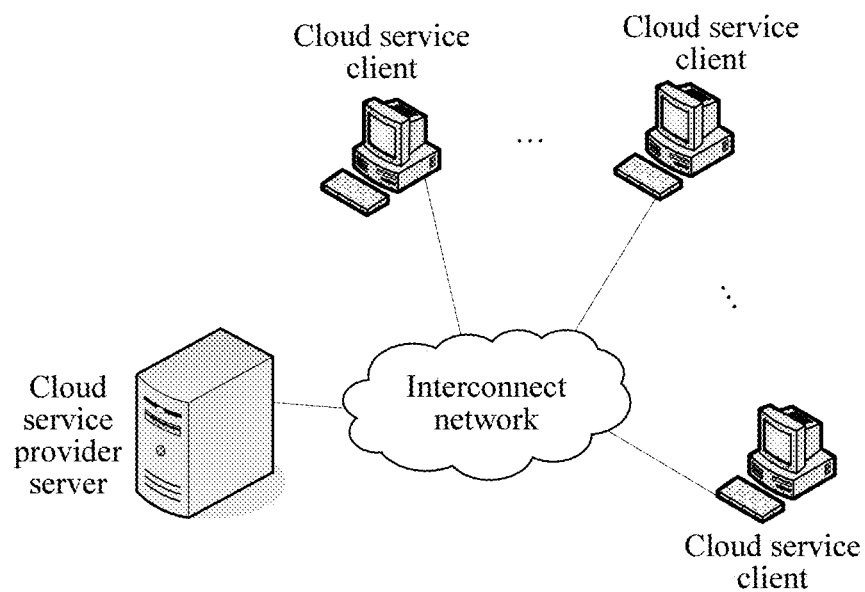
FIG. 1 is a schematic diagram of a cloud service network architecture according to an embodiment of the present disclosure.

First, refer to FIG. 1. FIG. 1 is a schematic diagram of a cloud service network architecture according to an embodiment of the present disclosure. A CSP server may provide a requested cloud service for multiple cloud service clients. A cloud service client may apply to the CSP server for a cloud application service. Technical solutions in some embodiments of the present disclosure may be further implemented based on the cloud service network architecture shown in FIG. 1.

Figure 2A:
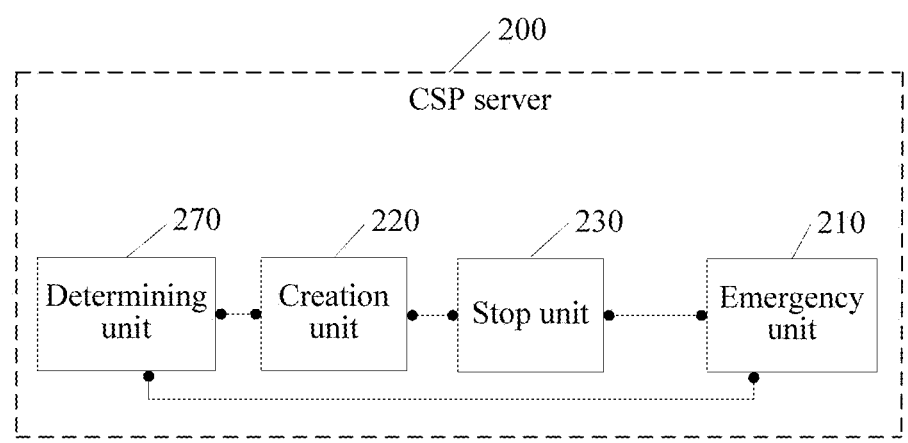
FIG. 2A is a schematic diagram of a CSP server according to an embodiment of the present disclosure.

Referring to FIG. 2A, an embodiment of the present disclosure provides a CSP server 200, which may include a determining unit 270, an emergency unit 210, a creation unit 220, and a stop unit 230. The determining unit 270 is configured to determine that a working state of a first virtual machine satisfies a condition for adding a virtual machine.

The emergency unit 210 is configured to determine, according to a determining result of the determining unit 270, and an emergency policy corresponding to a first application running on the first virtual machine, a second application that has an emergency relationship with the first application, and instruct a second virtual machine on which the second application is hosted to run the first application deployed on the second virtual machine.

The first application may be any application currently running on the first virtual machine, or the first application may be a particular application running on the first virtual machine. For example, the first application may be a user application, a system application, or the like.

The creation unit 220 is configured to create, according to the determining result of the determining unit 270, a third virtual machine, and deploy and start the first application on the third virtual machine.

Because the second application and the first application have an emergency relationship, the second application may also be referred to as a resource lending application of the first application, and the first application may be referred to as a resource borrowing application (or may be referred to as an application that requests an emergency service) of the second application. The second virtual machine on which the second application is hosted may also be referred to as an emergency virtual machine (or referred to as a resource lending virtual machine) of the first virtual machine. Because the second virtual machine on which the second application is hosted allows lending a resource to the first virtual machine for an emergency need. Running the first application on the second virtual machine is to serve an emergency need of the first application running on the first virtual machine (that is, the first application is run on the second virtual machine to temporarily share processing load of the first application running on the first virtual machine). Therefore, the first application deployed on the second virtual machine may be referred to as an emergency application of the first application running on the first virtual machine.

The stop unit 230 is configured to instruct the second virtual machine to stop running the first application deployed on the second virtual machine after the first application deployed on the third virtual machine is started on the third virtual machine.

It is understandable that after the third virtual machine runs the first application deployed on the third virtual machine, the first application deployed on the third virtual machine and running on the third virtual machine may share the load of the first application deployed on the first virtual machine running on the first virtual machine. In this case, an emergency mission of the first application deployed on the second virtual machine and running on the second virtual machine is completed. Therefore, the CSP server may instruct the second virtual machine to stop running the first application deployed on the second virtual machine after the third virtual machine runs the first application.

In some embodiments of the present disclosure, the condition for adding a virtual machine may include at least one of the following conditions, a resource utilization rate of the first virtual machine exceeds a first threshold, a throughput in per unit time of the first application running on the first virtual machine exceeds a second threshold, or a response latency of the first application running on the virtual machine exceeds a third threshold.

Figure 2B:
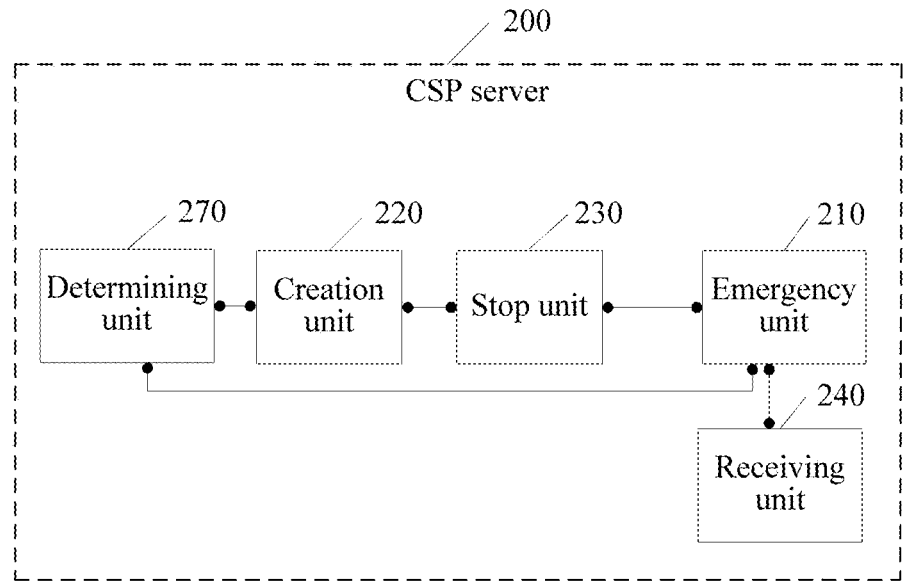
FIG. 2B is a schematic diagram of another CSP server according to an embodiment of the present disclosure.

Referring to FIG. 2B, in some embodiments of the present disclosure, the CSP server 200 may further include a receiving unit 240 configured to receive an application deployment request before the second application that has an emergency relationship with the first application is determined, where the application deployment request carries the emergency policy corresponding to the first application, and the emergency policy corresponding to the first application describes that the first application has an emergency relationship with the second application.

The first application that has an emergency relationship with the second application may indicate that the first application and the second application serve an emergency need for each other (that is, a virtual machine on which the second application is hosted and a virtual machine on which the first application is hosted may temporarily lend a virtual machine resource to each other), or that the second application serves an emergency need for the first application (that is, a virtual machine on which the second application is hosted may temporarily lend a virtual machine resource to a virtual machine on which the first application is hosted).

In some embodiments of the present disclosure, the application deployment request further carries a relationship template, where a host-on relationship, described in the relationship template, between the first application and a third application is that the first application is hosted on the third application, or a host-on relationship, described in the relationship template, between the first application and a third application is that the first application and the third application are mutually hosted on each other.

Figure 2C:
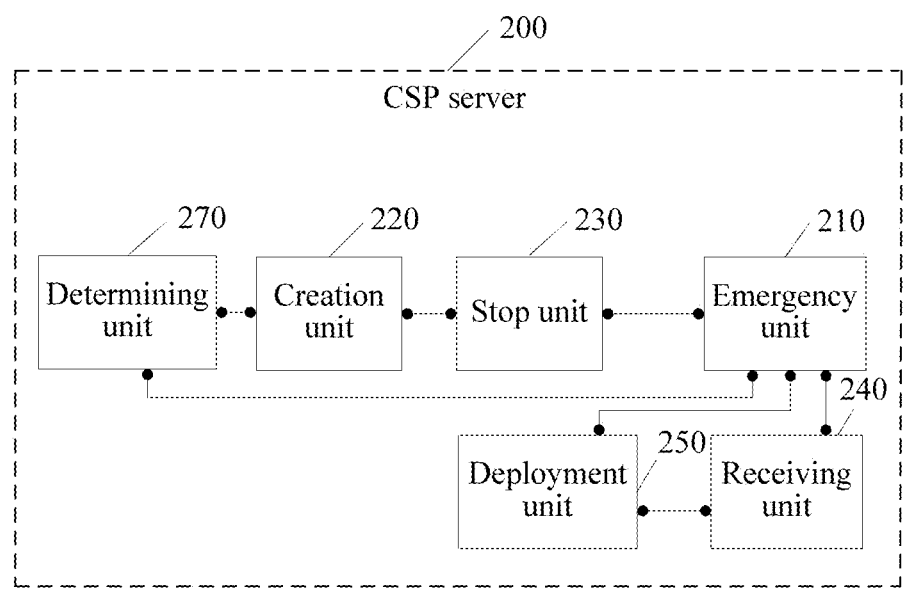
FIG. 2C is a schematic diagram of another CSP server according to an embodiment of the present disclosure.

Referring to FIG. 2C, the CSP server 200 may further include a deployment unit 250 configured to deploy, on the second virtual machine, the third application that has a host-on relationship with the first application before the second virtual machine on which the second application is hosted is instructed to run the first application deployed on the second virtual machine.

In some embodiments of the present disclosure, if the application deployment request further carries a second relationship template (the second relationship template may be included in an application description file in an application deployment package carried in the application deployment request), where the second relationship template describes that there is a connection relationship between the first application and a fourth application, and the connection relationship, described in the second relationship template, between the first application and the fourth application is that the first application is connected to the fourth application, before the second virtual machine on which the second application is hosted is instructed to run the first application deployed on the second virtual machine, the deployment unit 250 may be further configured to instruct to connect the first application to the fourth application the first application deployed on the second virtual machine to the fourth application. In addition, if the connection relationship, described in the second relationship template, between the first application and the fourth application is that the first application and the fourth application are mutually connected, the deployment unit 250 may be further configured to instruct to establish a mutual connection between the first application deployed on the second virtual machine and the fourth application. In addition, if the connection relationship, described in the second relationship template, between the first application and the fourth application is that the fourth application is connected to the first application, the deployment unit 250 may be further configured to instruct, before or after the second virtual machine on which the second application is hosted is instructed to run the first application deployed on the second virtual machine to connect the fourth application to the first application deployed on the second virtual machine. The deployment unit 250 that connects the first application to the fourth application generally refers to establishing a communicable relationship between the first application and the fourth application, for example, record information such as an Internet Protocol (IP) address and a port number that are corresponding to the fourth application into a configuration file of the first application, and so on.

In some embodiments of the present disclosure, the emergency policy includes an emergency trigger condition. The emergency unit 210 that instructs the second virtual machine on which the second application is hosted to run the first application deployed on the second virtual machine may include instructing the second virtual machine on which the second application is hosted to run the first application deployed on the second virtual machine when determining that the emergency trigger condition is satisfied.

The emergency trigger condition may be set according to different scenarios and different needs. For example, the emergency trigger condition may include that a quantity of idle resources of the second virtual machine is greater than or equal to a minimum quantity of resources required to run the first application on the second virtual machine (when the first application does not need to be hosted on another application, the minimum quantity of resources required to run the first application on the second virtual machine is equal to a minimum quantity of resources required to run the first application itself on the second virtual machine, when the first application needs to be hosted on another application, the minimum quantity of resources required to run the first application on the second virtual machine is equal to a minimum quantity of resources for running the other application on which the first application needs to be hosted on the second virtual machine plus a minimum quantity of resources required to run the first application itself on the second virtual machine). For another example, the emergency trigger condition may include that a quantity of idle resources of the second virtual machine is greater than or equal to a maximum quantity of resources required to run the first application on the second virtual machine (the maximum quantity of resources required to run the first application on the second virtual machine is equal to a maximum quantity of resources required to run the first application itself on the second virtual machine when the first application does not need to be hosted on another application, and the maximum quantity of resources required to run the first application on the second virtual machine is equal to a maximum quantity of resources for running another application on which the first application needs to be hosted on the second virtual machine plus a maximum quantity of resources required to run the first application itself on the second virtual machine when the first application needs to be hosted on the other application). For another example, the emergency trigger condition may include that a quantity of idle resources of the second virtual machine is greater than or equal to an average quantity of resources required to run the first application on the second virtual machine (the average quantity of resources required to run the first application on the second virtual machine is equal to an average quantity of resources required to run the first application itself on the second virtual machine when the first application does not need to be hosted on another application, and the average quantity of resources required to run the first application on the second virtual machine is equal to an average quantity of resources for running another application on which the first application needs to be hosted on the second virtual machine plus an average quantity of resources required to run the first application itself on the second virtual machine when the first application needs to be hosted on the other application).

In other embodiments of the present disclosure, the emergency trigger condition may include that a quantity of idle resources of the second virtual machine minus a first resource quantity threshold is greater than or equal to a minimum quantity of resources required to run the first application on the second virtual machine, where the first resource quantity threshold is greater than 0.

In some embodiments of the present disclosure, the emergency unit 210 may be further configured to deploy the first application on the second virtual machine, before the second virtual machine on which the second application is hosted is instructed to run the first application deployed on the second virtual machine and after it is determined that the second virtual machine has sufficient idle resources for deploying the first application.

Figure 2D:
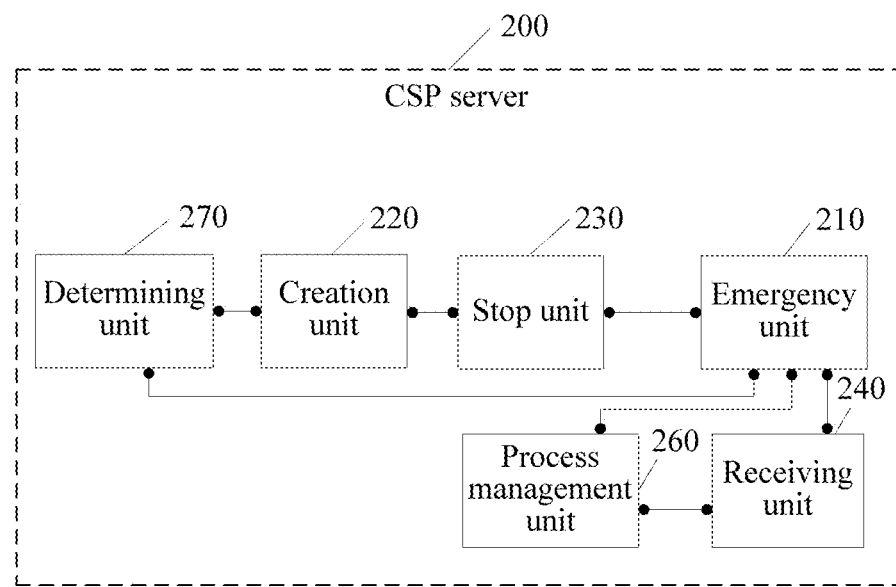
FIG. 2D is a schematic diagram of another CSP server according to an embodiment of the present disclosure.

Referring to FIG. 2D, in some embodiments of the present disclosure, the CSP server 200 may further include a process management unit 260 configured to add some or all processes being running on the second virtual machine to a first process group, and set a maximum quantity of available resources for the first process group before the second virtual machine on which the second application is hosted is instructed to run the first application deployed on the second virtual machine.

In some embodiments of the present disclosure, the process management unit 260 is further configured to add a process of the first application to a second process group, and set a maximum quantity of available resources for the second process group after the second virtual machine on which the second application is hosted is instructed to run the first application deployed on the second virtual machine.

In some embodiments of the present disclosure, the process management unit 260 is further configured to delete the second process group and dissolve the first process group after the second virtual machine stops running the first application.

It is understandable that introducing a process group and setting a maximum quantity of available resources for the process group help implement performance isolation between an existing process and an emergency process, and further help reduce an adverse effect of implementation of an emergency policy on an existing application. It is understandable that a sum of the maximum quantity of available resources for the second process group and the maximum quantity of available resources for the first process group is less than or equal to a maximum quantity of available resources for the second virtual machine.

It is understandable that the CSP server 200 in this embodiment may be configured to implement some or all functions of a CSP server described in the following method embodiment. Functions of the functional modules of the CSP server 200 may be implemented according to a method in the following method embodiment. For a specific implementation procedure thereof, reference may be made to related descriptions in the method embodiment, and details are not described herein again.

It may be seen that, in the solution of this embodiment, after determining that a working state of a first virtual machine satisfies a condition for adding a virtual machine, a CSP server 200 determines, according to an emergency policy corresponding to a first application running on the first virtual machine, a second application that has an emergency relationship with the first application, and instructs a second virtual machine on which the second application is hosted to run the first application deployed on the second virtual machine, and creates a third virtual machine, and deploys and starts the first application on the third virtual machine. After the third virtual machine runs the first application deployed on the third virtual machine, the CSP server instructs the second virtual machine to stop running the first application deployed on the second virtual machine. An emergency policy between a first application and a second application is introduced, and based on the emergency policy, it may be implemented that a second virtual machine temporarily lends a resource to a first virtual machine. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment of the present disclosure helps improve a utilization rate of virtual machine resources because no standby virtual machine needs to be created in advance. Moreover, a temporary resource lending mechanism between virtual machines is introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

Figure 3:
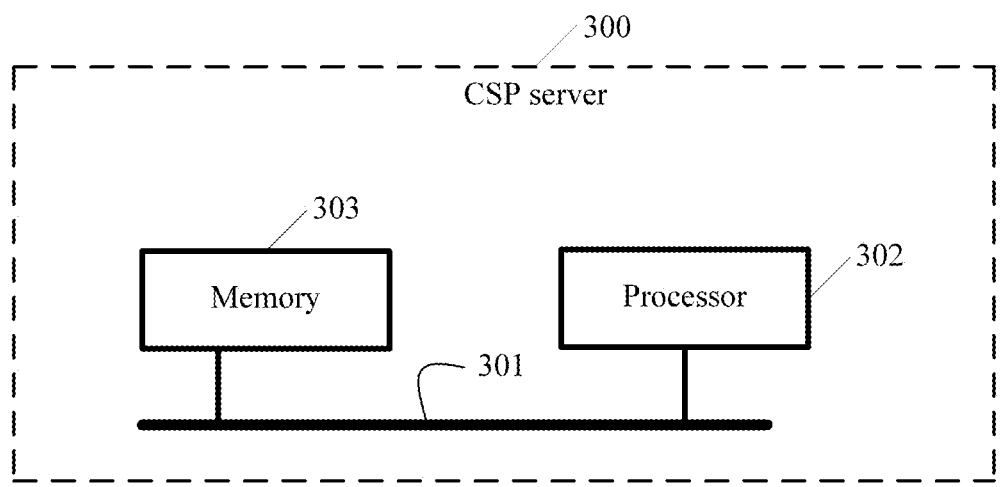
FIG. 3 is a schematic diagram of another CSP server according to an embodiment of the present disclosure.

Referring to FIG. 3, FIG. 3 is a schematic diagram of a CSP server 300 according to another embodiment of the present disclosure. The CSP server 300 may include at least one bus 301, at least one processor 302 connected to the bus 301, and at least one memory 303 connected to the bus 301.

By calling a code in the memory 303, the processor 302 is configured to determine that a working state of a first virtual machine satisfies a condition for adding a virtual machine, determine, according to an emergency policy corresponding to a first application running on the first virtual machine, a second application that has an emergency relationship with the first application, and instruct a second virtual machine on which the second application is hosted to run the first application deployed on the second virtual machine, create a third virtual machine, and deploy and start the first application on the third virtual machine, and instruct the second virtual machine to stop running the first application after the first application is started on the third virtual machine.

The first application may be any application currently running on the first virtual machine, or the first application may be a particular application currently running on the first virtual machine. For example, the first application may be a user application, a system application, or the like. The second virtual machine is a virtual machine on which the second application that has an emergency relationship with the first application and the first application are deployed.

Certainly, in addition to the emergency relationship, there may also be another association relationship between the first application and the second application. For example, there may also be a connection relationship between the first application and the second application.

Because the second application has an emergency relationship with the first application, the second application may also be referred to as a resource lending application of the first application, and the first application may be referred to as a resource borrowing application (or may be referred to as an application that requests an emergency service) of the second application. The second virtual machine on which the second application is hosted may also be referred to as an emergency virtual machine (or referred to as a resource lending virtual machine) of the first virtual machine because the second virtual machine on which the second application is hosted allows lending a resource to the first virtual machine for an emergency need. Running, on the second virtual machine, the first application that is deployed on the second virtual machine, is to serve an emergency need of the first application running on the first virtual machine (that is, the first application deployed on the second virtual machine is run on the second virtual machine to temporarily share processing load of the first application that is deployed on the first virtual machine and running on the first virtual machine). Therefore, the first application deployed on the second virtual machine may be referred to as an emergency application of the first application running on the first virtual machine.

It is understandable that after the first application deployed on the third virtual machine is started on the third virtual machine, the first application deployed on the third virtual machine and running on the third virtual machine may share the processing load of the first application running on the first virtual machine. In this case, an emergency mission of the first application deployed on the second virtual machine and running on the second virtual machine is completed. Therefore, the CSP server may instruct the second virtual machine to stop running the first application deployed on the second virtual machine after the third virtual machine runs the first application deployed on the third virtual machine.

In some embodiments of the present disclosure, the condition for adding a virtual machine may include at least one of the following conditions, a resource utilization rate of the first virtual machine exceeds a first threshold, a throughput per unit time of the first application running on the first virtual machine exceeds a second threshold, or a response latency of the first application running on the virtual machine exceeds a third threshold.

In some embodiments of the present disclosure, by calling the code in the memory 303, the processor 302 is further configured to receive an application deployment request before determining, according to the emergency policy corresponding to the first application running on the first virtual machine, the second application that has an emergency relationship with the first application, where the application deployment request carries the emergency policy corresponding to the first application, and the emergency policy corresponding to the first application describes that the first application has an emergency relationship with the second application.

The first application that has an emergency relationship with the second application may indicate that the first application and the second application serve an emergency need of each other (that is, a virtual machine on which the second application is hosted and a virtual machine on which the first application is hosted may temporarily lend a virtual machine resource to each other), or that the second application serves an emergency need of the first application (that is, a virtual machine on which the second application is hosted may temporarily lend a virtual machine resource to a virtual machine on which the first application is hosted).

In some embodiments of the present disclosure, the application deployment request further carries a relationship template, where a host-on relationship, described in the relationship template, between the first application and a third application is that the first application is hosted on the third application, or a host-on relationship, described in the relationship template, between the first application and a third application is that the first application and the third application are mutually hosted on each other. By calling the code in the memory 303, the processor 302 is further configured to deploy, on the second virtual machine, the third application that has a host-on relationship with the first application before instructing the second virtual machine on which the second application is hosted to run the first application deployed on the second virtual machine.

In some embodiments of the present disclosure, if the application deployment request further carries a second relationship template (the second relationship template may be included in an application description file in an application deployment package carried in the application deployment request), where the second relationship template describes that there is a connection relationship between the first application and a fourth application, and the connection relationship, described in the second relationship template, between the first application and the fourth application is that the first application is connected to the fourth application, before instructing the second virtual machine on which the second application is hosted to run the first application deployed on the second virtual machine, by calling the code in the memory 303, the processor 302 is further configured to instruct to connect the first application to the fourth application. In addition, if the connection relationship, described in the second relationship template, between the first application and the fourth application is that the first application and the fourth application are mutually connected, before the second virtual machine on which the second application is hosted is instructed to run the first application deployed on the second virtual machine, by calling the code in the memory 303, the processor 302 is further configured to instruct to establish a mutual connection between the first application and the fourth application. In addition, if the connection relationship, described in the second relationship template, between the first application and the fourth application is that the fourth application is connected to the first application, before or after instructing the second virtual machine on which the second application is hosted to run the first application deployed on the second virtual machine, by calling the code in the memory 303, the processor 302 is further configured to instruct to connect the fourth application to the first application.

In some embodiments of the present disclosure, the emergency policy includes an emergency trigger condition.

In the aspect of instructing the second virtual machine on which the second application is hosted to run the first application deployed on the second virtual machine, in some embodiments of the present disclosure, by calling the code in the memory 303, the processor 302 is further configured to instruct, when determining that the emergency trigger condition is satisfied, the second virtual machine on which the second application is hosted to run the first application deployed on the second virtual machine.

The emergency trigger condition may be set according to different scenarios and different needs. For example, the emergency trigger condition may include that a quantity of idle resources of the second virtual machine is greater than or equal to a minimum quantity of resources required to run the first application on the second virtual machine (the minimum quantity of resources required to run the first application on the second virtual machine is equal to a minimum quantity of resources required to run the first application itself on the second virtual machine when the first application does not need to be hosted on another application, and the minimum quantity of resources required to run the first application on the second virtual machine is equal to a minimum quantity of resources for running another application on which the first application needs to be hosted on the second virtual machine plus a minimum quantity of resources required to run the first application itself on the second virtual machine when the first application needs to be hosted on the other application). For another example, the emergency trigger condition may include that a quantity of idle resources of the second virtual machine is greater than or equal to a maximum quantity of resources required to run the first application on the second virtual machine (the maximum quantity of resources required to run the first application on the second virtual machine is equal to a maximum quantity of resources required to run the first application itself on the second virtual machine when the first application does not need to be hosted on another application, and the maximum quantity of resources required to run the first application on the second virtual machine is equal to a maximum quantity of resources for running another application on which the first application needs to be hosted on the second virtual machine plus a maximum quantity of resources required to run the first application itself on the second virtual machine when the first application needs to be hosted on the other application). For another example, the emergency trigger condition may include that a quantity of idle resources of the second virtual machine is greater than or equal to an average quantity of resources required to run the first application on the second virtual machine (the average quantity of resources required to run the first application on the second virtual machine is equal to an average quantity of resources required to run the first application itself on the second virtual machine when the first application does not need to be hosted on another application, and the average quantity of resources required to run the first application on the second virtual machine is equal to an average quantity of resources for running another application on which the first application needs to be hosted on the second virtual machine plus an average quantity of resources required to run the first application itself on the second virtual machine when the first application needs to be hosted on the other application).

In some embodiments of the present disclosure, by calling the code in the memory 303, the processor 302 is further configured to deploy the first application on the second virtual machine before instructing the second virtual machine on which the second application is hosted to run the first application deployed on the second virtual machine and after determining that the second virtual machine has sufficient idle resources for deploying the first application.

In some embodiments of the present disclosure, by calling the code in the memory 303, the processor 302 is further configured to add, before instructing the second virtual machine on which the second application is hosted to run the first application deployed on the second virtual machine, some or all processes being running on the second virtual machine to a first process group, and set a maximum quantity of available resources for the first process group.

In some embodiments of the present disclosure, by calling the code in the memory 303, the processor 302 is further configured to add, after instructing the second virtual machine on which the second application is hosted to run the first application deployed on the second virtual machine, a process of the first application to a second process group, and set a maximum quantity of available resources for the second process group.

In some embodiments of the present disclosure, by calling the code in the memory 303, the processor 302 is further configured to delete the second process group, and dissolve the first process group after the second virtual machine stops running the first application deployed on the second virtual machine.

It is understandable that introducing a process group and setting a maximum quantity of available resources for the process group help implement performance isolation between an existing process and an emergency process, and further help reduce an adverse effect of implementation of an emergency policy on an existing application. It is understandable that a sum of the maximum quantity of available resources for the second process group and the maximum quantity of available resources for the first process group is less than or equal to a maximum quantity of available resources for the second virtual machine.

For example, assuming that a fifth application currently also runs on the first virtual machine, by calling the code in the memory 303, the processor 302 is further configured to determine, according to an emergency policy corresponding to the fifth application running on the first virtual machine, a sixth application that has an emergency relationship with the fifth application, and instruct a fifth virtual machine on which the sixth application is hosted to run the fifth application deployed on the fifth virtual machine, create a fourth virtual machine, and deploy and start the fifth application on the fourth virtual machine, and instruct the fifth virtual machine to stop running the fifth application deployed on the fifth virtual machine after the fourth virtual machine starts the fifth application deployed on the fourth virtual machine. Running the fifth application on the fifth virtual machine is to serve an emergency need of the fifth application running on the first virtual machine to temporarily share processing load of the fifth application running on the first virtual machine. Therefore, the fifth application deployed on the fifth virtual machine may be referred to as an emergency application of the fifth application running on the first virtual machine.

It is understandable that the CSP server 300 in this embodiment may be configured to implement some or all functions of a CSP server described in the following method embodiment. Functions of the functional modules of the CSP server 300 may be implemented according to a method in the following method embodiment. For a specific implementation procedure thereof, reference may be made to related descriptions in the method embodiment, and details are not described herein again.

It may be seen that, in the solution of this embodiment, after determining that a working state of a first virtual machine satisfies a condition for adding a virtual machine, a CSP server 300 determines, according to an emergency policy corresponding to a first application running on the first virtual machine, a second application that has an emergency relationship with the first application, and instructs a second virtual machine on which the second application is hosted to run the first application deployed on the second virtual machine, and creates a third virtual machine, and deploys and starts the first application on the third virtual machine. After the third virtual machine runs the first application deployed on the third virtual machine, the CSP server instructs the second virtual machine to stop running the first application deployed on the second virtual machine. An emergency policy between a first application and a second application is introduced, and based on the emergency policy, it may be implemented that a second virtual machine temporarily lends a resource to a first virtual machine. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment of the present disclosure helps improve a utilization rate of virtual machine resources because no standby virtual machine needs to be created in advance. Moreover, a temporary resource lending mechanism between virtual machines is introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

Figure 4:
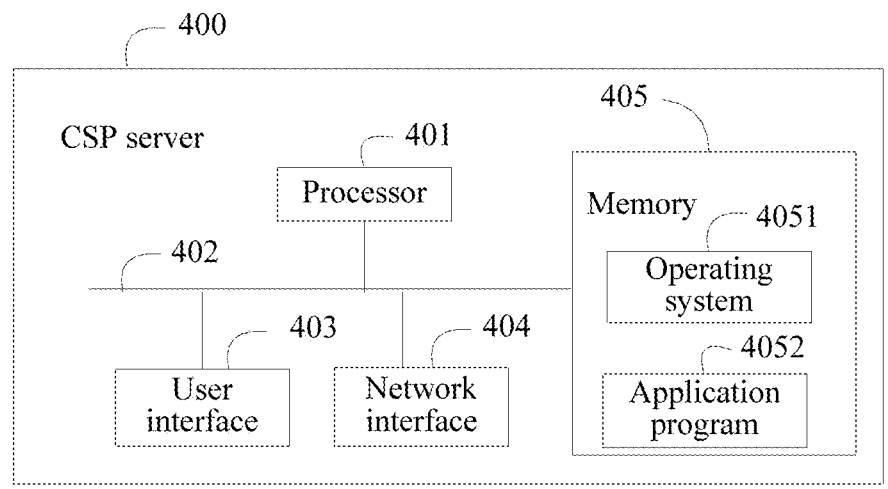
FIG. 4 is a schematic diagram of another CSP server according to an embodiment of the present disclosure.

Referring to FIG. 4, FIG. 4 is a structural block diagram of a CSP server 400 according to another embodiment of the present disclosure.

The CSP server 400 may include at least one processor 401, at least one network interface 404 or a user interface 403, a memory 405, and at least one communications bus 402. The communications bus 402 is configured to implement connections and communication between these components. The CSP server 400 optionally includes the user interface 403, including a display (for example, a touchscreen, a liquid crystal display (LCD), a cathode ray tube (CRT), holographic imaging device, or a projector), a click device (for example, a mouse, a trackball, a touchpad, or a touchscreen), a camera, a pickup device, and/or the like. For example, the memory 405 may include a read-only memory (ROM) and a random access memory (RAM), and provide an instruction and data for the processor 401.

A part of the memory 405 further includes a nonvolatile random access memory (NVRAM) and the like.

In some implementation manners, the memory 405 stores the elements such as an executable module or a data structure, or their subsets, or their extended sets.

An operating system 4051 includes various types of system programs for implementing various types of basic services and processing hardware-based tasks.

An application program module 4052 includes various types of application programs for implementing various types of application services. For example, the application program module 4052 may include at least one of the following units a determining unit 270, an emergency unit 210, a creation unit 220, a stop unit 230, a receiving unit 240, a deployment unit 250, or a process management unit 260.

In this embodiment of the present disclosure, by calling a program or an instruction stored in the memory 405, the processor 401 may be configured to determine that a working state of a first virtual machine satisfies a condition for adding a virtual machine, determine, according to an emergency policy corresponding to a first application running on the first virtual machine, a second application that has an emergency relationship with the first application, and instruct a second virtual machine on which the second application is hosted to run the first application deployed on the second virtual machine, create a third virtual machine, and deploy and start the first application on the third virtual machine, and instruct the second virtual machine to stop running the first application after the first application is started on the third virtual machine.

The first application may be any application currently running on the first virtual machine, or the first application may be a particular application currently running on the first virtual machine. For example, the first application may be a user application, a system application, or the like. The second virtual machine is a virtual machine on which the second application that has an emergency relationship with the first application and the first application are deployed.

Certainly, in addition to the emergency relationship, there may also be another association relationship between the first application and the second application. For example, there may also be a connection relationship between the first application and the second application.

Because the second application has an emergency relationship with the first application, the second application may also be referred to as a resource lending application of the first application, and the first application may be referred to as a resource borrowing application (or may be referred to as an application that requests an emergency service) of the second application. The second virtual machine on which the second application is hosted may also be referred to as an emergency virtual machine (or referred to as a resource lending virtual machine) of the first virtual machine because the second virtual machine on which the second application is hosted allows lending a resource to the first virtual machine for an emergency need. Running, on the second virtual machine, the first application that is deployed on the second virtual machine, is to serve an emergency need of the first application running on the first virtual machine (that is, the first application deployed on the second virtual machine is run on the second virtual machine to temporarily share processing load of the first application that is deployed on the first virtual machine and running on the first virtual machine). Therefore, the first application deployed on the second virtual machine may be referred to as an emergency application of the first application running on the first virtual machine.

It is understandable that after the first application deployed on the third virtual machine is started on the third virtual machine, the first application deployed on the third virtual machine and running on the third virtual machine may share the processing load of the first application running on the first virtual machine. In this case, an emergency mission of the first application deployed on the second virtual machine and running on the second virtual machine is completed. Therefore, after the third virtual machine runs the first application deployed on the third virtual machine, the CSP server may instruct the second virtual machine to stop running the first application deployed on the second virtual machine.

In some embodiments of the present disclosure, the condition for adding a virtual machine may include at least one of the following conditions, a resource utilization rate of the first virtual machine exceeds a first threshold, a throughput per unit time of the first application running on the first virtual machine exceeds a second threshold, or a response latency of the first application running on the virtual machine exceeds a third threshold.

In some embodiments of the present disclosure, by calling a program or an instruction stored in the memory 405, the processor 401 may be configured to receive an application deployment request before determining, according to the emergency policy corresponding to the first application running on the first virtual machine, the second application that has an emergency relationship with the first application, where the application deployment request carries the emergency policy corresponding to the first application, and the emergency policy corresponding to the first application describes that the first application has an emergency relationship with the second application.

The first application that has an emergency relationship with the second application may indicate that the first application and the second application serve an emergency need of each other (that is, a virtual machine on which the second application is hosted and a virtual machine on which the first application is hosted may temporarily lend a virtual machine resource to each other), or that the second application serves an emergency need of the first application (that is, a virtual machine on which the second application is hosted may temporarily lend a virtual machine resource to a virtual machine on which the first application is hosted).

In some embodiments of the present disclosure, the application deployment request further carries a relationship template, where a host-on relationship, described in the relationship template, between the first application and a third application is that the first application is hosted on the third application, or a host-on relationship, described in the relationship template, between the first application and a third application is that the first application and the third application are mutually hosted on each other. By calling the program or the instruction stored in the memory 405, the processor 401 may be configured to deploy, on the second virtual machine, the third application that has a host-on relationship with the first application before instructing the second virtual machine on which the second application is hosted to run the first application deployed on the second virtual machine.

In some embodiments of the present disclosure, if the application deployment request further carries a second relationship template (the second relationship template may be included in an application description file in an application deployment package carried in the application deployment request), where the second relationship template describes that there is a connection relationship between the first application and a fourth application, and the connection relationship, described in the second relationship template, between the first application and the fourth application is that the first application is connected to the fourth application, before instructing the second virtual machine on which the second application is hosted to run the first application deployed on the second virtual machine, by calling the program or the instruction stored in the memory 405, the processor 401 may be configured to instruct to connect the first application to the fourth application. In addition, if the connection relationship, described in the second relationship template, between the first application and the fourth application is that the first application and the fourth application are mutually connected, before instructing the second virtual machine on which the second application is hosted to run the first application deployed on the second virtual machine, by calling the program or the instruction stored in the memory 405, the processor 401 may be configured to instruct to establish a mutual connection between the first application and the fourth application. In addition, if the connection relationship, described in the second relationship template, between the first application and the fourth application is that the fourth application is connected to the first application, before or after instructing the second virtual machine on which the second application is hosted to run the first application deployed on the second virtual machine, by calling the program or the instruction stored in the memory 405, the processor 401 may be configured to instruct to connect the fourth application to the first application.

In some embodiments of the present disclosure, the emergency policy includes an emergency trigger condition.

In the aspect of instructing the second virtual machine on which the second application is hosted to run the first application deployed on the second virtual machine, in some embodiments of the present disclosure, by calling the program or the instruction stored in the memory 405, the processor 401 may be further configured to instruct, when determining that the emergency trigger condition is satisfied, the second virtual machine on which the second application is hosted to run the first application deployed on the second virtual machine.

The emergency trigger condition may be set according to different scenarios and different needs. For example, the emergency trigger condition may include that a quantity of idle resources of the second virtual machine is greater than or equal to a minimum quantity of resources required to run the first application on the second virtual machine (the minimum quantity of resources required to run the first application on the second virtual machine is equal to a minimum quantity of resources required to run the first application itself on the second virtual machine when the first application does not need to be hosted on another application, and the minimum quantity of resources required to run the first application on the second virtual machine is equal to a minimum quantity of resources for running another application on which the first application needs to be hosted on the second virtual machine plus a minimum quantity of resources required to run the first application itself on the second virtual machine when the first application needs to be hosted on the other application). For another example, the emergency trigger condition may include that a quantity of idle resources of the second virtual machine is greater than or equal to a maximum quantity of resources required to run the first application on the second virtual machine (the maximum quantity of resources required to run the first application on the second virtual machine is equal to a maximum quantity of resources required to run the first application itself on the second virtual machine when the first application does not need to be hosted on another application, and the maximum quantity of resources required to run the first application on the second virtual machine is equal to a maximum quantity of resources for running another application on which the first application needs to be hosted on the second virtual machine plus a maximum quantity of resources required to run the first application itself on the second virtual machine when the first application needs to be hosted on the other application). For another example, the emergency trigger condition may include that a quantity of idle resources of the second virtual machine is greater than or equal to an average quantity of resources required to run the first application on the second virtual machine (the average quantity of resources required to run the first application on the second virtual machine is equal to an average quantity of resources required to run the first application itself on the second virtual machine when the first application does not need to be hosted on another application, and the average quantity of resources required to run the first application on the second virtual machine is equal to an average quantity of resources for running another application on which the first application needs to be hosted on the second virtual machine plus an average quantity of resources required to run the first application itself on the second virtual machine when the first application needs to be hosted on the other application).

In some embodiments of the present disclosure, by calling the program or the instruction stored in the memory 405, the processor 401 may be configured to deploy the first application on the second virtual machine before instructing the second virtual machine on which the second application is hosted to run the first application deployed on the second virtual machine and after determining that the second virtual machine has sufficient idle resources for deploying the first application.

In some embodiments of the present disclosure, by calling the program or the instruction stored in the memory 405, the processor 401 may be configured to add, before instructing the second virtual machine on which the second application is hosted to run the first application deployed on the second virtual machine, some or all processes being running on the second virtual machine to a first process group, and set a maximum quantity of available resources for the first process group.

In some embodiments of the present disclosure, by calling the program or the instruction stored in the memory 405, the processor 401 may be configured to add, after instructing the second virtual machine on which the second application is hosted to run the first application deployed on the second virtual machine, a process of the first application to a second process group, and set a maximum quantity of available resources for the second process group.

In some embodiments of the present disclosure, by calling the program or the instruction stored in the memory 405, the processor 401 may be configured to delete the second process group, and dissolve the first process group after the second virtual machine stops running the first application deployed on the second virtual machine.

It is understandable that introducing a process group and setting a maximum quantity of available resources for the process group help implement performance isolation between an existing process and an emergency process, and further help reduce an adverse effect of implementation of an emergency policy on an existing application. It is understandable that a sum of the maximum quantity of available resources for the second process group and the maximum quantity of available resources for the first process group is less than or equal to a maximum quantity of available resources for the second virtual machine.

For example, assuming that a fifth application currently also runs on the first virtual machine, by calling the program or the instruction stored in the memory 405, the processor 401 may be configured to determine, according to an emergency policy corresponding to the fifth application running on the first virtual machine, a sixth application that has an emergency relationship with the fifth application, and trigger a fifth virtual machine on which the sixth application is hosted to run the fifth application deployed on the fifth virtual machine, create a fourth virtual machine, and deploy and start the fifth application on the fourth virtual machine, and after the fourth virtual machine starts the fifth application deployed on the fourth virtual machine, instruct the fifth virtual machine to stop running the fifth application deployed on the fifth virtual machine. Running the fifth application on the fifth virtual machine is to serve an emergency need of the fifth application running on the first virtual machine to temporarily share processing load of the fifth application running on the first virtual machine. Therefore, the fifth application deployed on the fifth virtual machine may be referred to as an emergency application of the fifth application running on the first virtual machine.

It is understandable that the CSP server 400 in this embodiment may be configured to implement some or all functions of a CSP server described in the following method embodiment. Functions of the functional modules of the CSP server 400 may be implemented further according to a method in the following method embodiment. For a specific implementation procedure thereof, reference may be made to related descriptions in the method embodiment, and details are not described herein again.

It may be seen that, in the solution of this embodiment, after determining that a working state of a first virtual machine satisfies a condition for adding a virtual machine, a CSP server 400 determines, according to an emergency policy corresponding to a first application running on the first virtual machine, a second application that has an emergency relationship with the first application, and instructs a second virtual machine on which the second application is hosted to run the first application deployed on the second virtual machine, and creates a third virtual machine, and deploys and starts the first application on the third virtual machine. After the third virtual machine runs the first application deployed on the third virtual machine, the CSP server instructs the second virtual machine to stop running the first application deployed on the second virtual machine. An emergency policy between a first application and a second application is introduced, and based on the emergency policy, it may be implemented that a second virtual machine temporarily lends a resource to a first virtual machine. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment of the present disclosure helps improve a utilization rate of virtual machine resources because no standby virtual machine needs to be created in advance. Moreover, a temporary resource lending mechanism between virtual machines is introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

Figure 5:
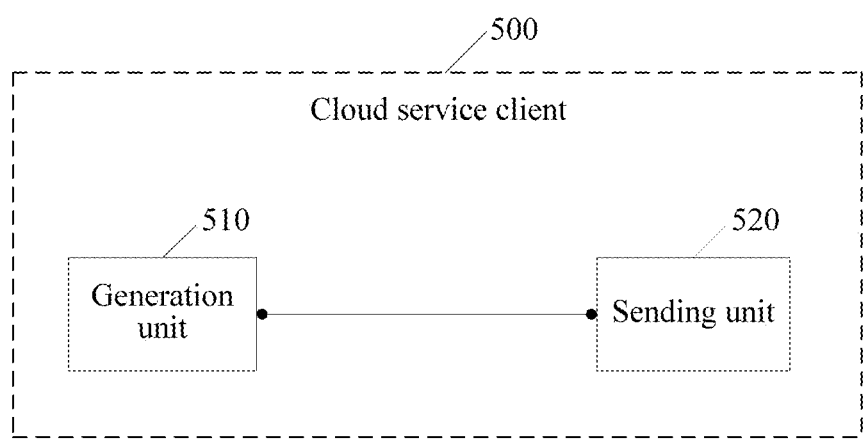
FIG. 5 is a schematic diagram of a cloud service client according to an embodiment of the present disclosure.

Referring to FIG. 5, an embodiment of the present disclosure further provides a cloud service client 500, which may include a generation unit 510 configured to generate an application deployment request, and a sending unit 520 configured to send the application deployment request to a CSP server. The application deployment request carries a node template corresponding to a first application and a node template corresponding to a second application, where the node template corresponding to the first application includes an emergency policy corresponding to the first application, and the emergency policy corresponding to the first application describes that the first application has an emergency relationship with the second application.

In some embodiments of the present disclosure, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other.

It is understandable that the cloud service client 500 in this embodiment may be configured to implement some or all functions of a cloud service client described in the following method embodiment. Functions of the functional modules of the cloud service client 500 may be implemented according to a method in the following method embodiment. For a specific implementation procedure thereof, reference may be made to related descriptions in the method embodiment, and details are not described herein again.

It may be seen that, in the solution of this embodiment, an emergency policy between a first application and a second application is introduced, and based on the emergency policy, it may be implemented that a second virtual machine on which the second application is hosted temporarily lends a resource to a first virtual machine on which the first application is hosted. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment helps improve a utilization rate of virtual machine resources because no standby virtual machine needs to be created in advance. Moreover, a temporary resource lending mechanism between virtual machines may be introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

Figure 6:
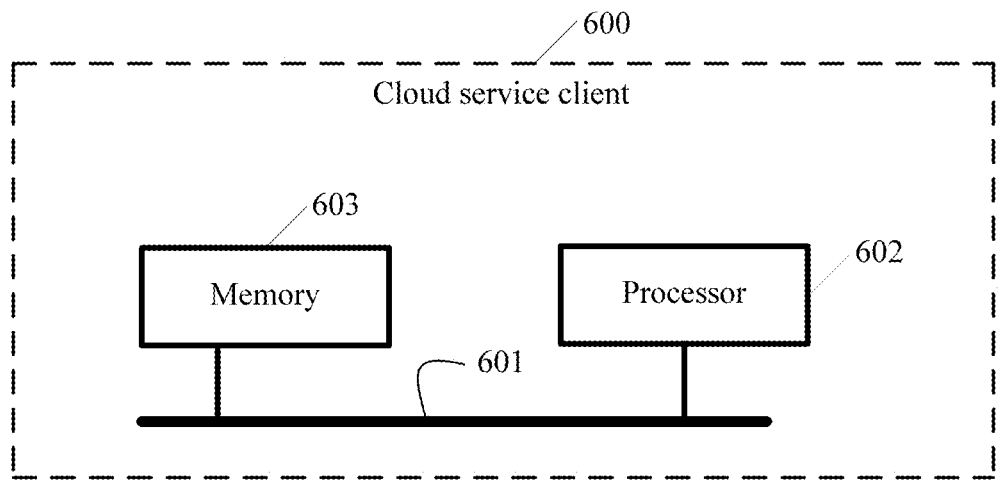
FIG. 6 is a schematic diagram of another cloud service client according to an embodiment of the present disclosure.

Referring to FIG. 6, an embodiment of the present disclosure further provides another cloud service client 600, which may include at least one bus 601, at least one processor 602 connected to the bus 601, and at least one memory 603 connected to the bus 601.

By calling a code in the memory 603, the processor 602 is configured to generate an application deployment request, and send the application deployment request to a CSP server, where the application deployment request carries a node template corresponding to a first application and a node template corresponding to a second application, where the node template corresponding to the first application includes an emergency policy corresponding to the first application, and the emergency policy corresponding to the first application describes that the first application has an emergency relationship with the second application.

In some embodiments of the present disclosure, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other.

It is understandable that the cloud service client 600 in this embodiment may be configured to implement some or all functions of a cloud service client described in the following method embodiment. Functions of the functional modules of the cloud service client 600 may be implemented according to a method in the following method embodiment. For a specific implementation procedure thereof, reference may be made to related descriptions in the method embodiment, and details are not described herein again.

It may be seen that, in the solution of this embodiment, an emergency policy between a first application and a second application is introduced, and based on the emergency policy, it may be implemented that a second virtual machine on which the second application is hosted temporarily lends a resource to a first virtual machine on which the first application is hosted. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment helps improve a utilization rate of virtual machine resources because no standby virtual machine needs to be created in advance. Moreover, a temporary resource lending mechanism between virtual machines may be introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

Figure 7:
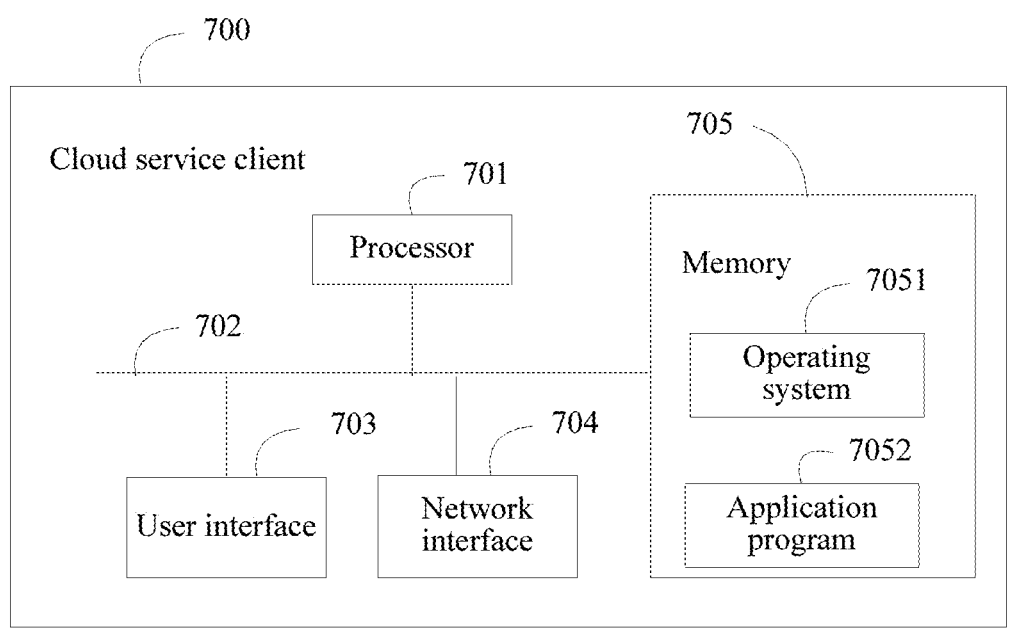
FIG. 7 is a schematic diagram of another cloud service client according to an embodiment of the present disclosure.

Referring to FIG. 7, FIG. 7 is a structural block diagram of a cloud service client 700 according to another embodiment of the present disclosure. The cloud service client 700 may include at least one processor 701, at least one network interface 704 or a user interface 703, a memory 705, and at least one communications bus 702. The communications bus 702 is configured to implement connections and communication between these components. The cloud service client 700 optionally includes the user interface 703, including a display (for example, a touchscreen, an LCD, a CRT, holographic imaging device, or a projector), a click device (for example, a mouse, a trackball, a touchpad, or a touchscreen), a camera, a pickup device, and/or the like.

For example, the memory 705 may include a ROM and a RAM, and provide an instruction and data for the processor 701.

A part of the memory 705 further includes an NVRAM and the like.

In some implementation manners, the memory 705 stores the elements such as an executable module or a data structure, or their subsets, or their extended sets.

An operating system 7051 includes various types of system programs for implementing various types of basic services and processing hardware-based tasks.

An application program module 7052 includes various types of application programs for implementing various types of application services.

For example, the application program module 7052 may include at least one of a generation unit 510 or a sending unit 520.

In this embodiment of the present disclosure, by calling a program or an instruction stored in the memory 705, the processor 701 may be configured to generate an application deployment request, and send the application deployment request to a CSP server. The application deployment request carries a node template corresponding to a first application and a node template corresponding to a second application, where the node template corresponding to the first application includes an emergency policy corresponding to the first application, and the emergency policy corresponding to the first application describes that the first application has an emergency relationship with the second application.

In some embodiments of the present disclosure, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other.

It is understandable that the cloud service client 700 in this embodiment may be configured to implement some or all functions of a cloud service client described in the following method embodiment. Functions of the functional modules of the cloud service client 700 may be implemented according to a method in the following method embodiment. For a specific implementation procedure thereof, reference may be made to related descriptions in the method embodiment, and details are not described herein again.

It may be seen that, in the solution of this embodiment, an emergency policy between a first application and a second application is introduced, and based on the emergency policy, it may be implemented that a second virtual machine on which the second application is hosted temporarily lends a resource to a first virtual machine on which the first application is hosted. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment helps improve a utilization rate of virtual machine resources because no standby virtual machine needs to be created in advance. Moreover, a temporary resource lending mechanism between virtual machines may be introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

Figure 8:
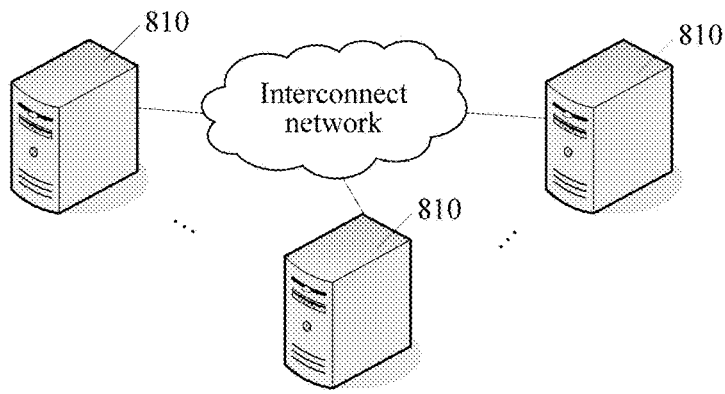
FIG. 8 is a schematic diagram of a cloud service system according to an embodiment of the present disclosure.

Referring to FIG. 8, an embodiment of the present disclosure further provides a cloud service system, including at least one CSP server 810, where the CSP server 810 may be the CSP server 200, the CSP server 300, or the CSP server 400 in the foregoing embodiments. The cloud service system may further include a cloud service client, where the cloud service client may be the cloud service client 500, or the cloud service client 600, or the cloud service client 700 in the foregoing embodiments.

In an embodiment of a cloud application processing method of the present disclosure, the cloud application processing method may include determining, by a CSP server, that a working state of a first virtual machine satisfies a condition for adding a virtual machine, determining, according to an emergency policy corresponding to a first application running on the first virtual machine, a second application that has an emergency relationship with the first application, and instructing a second virtual machine on which the second application is hosted to run the first application deployed on the second virtual machine, creating a third virtual machine, and deploying and starting the first application on the third virtual machine, and instructing the second virtual machine to stop running the first application after the first application is started on the third virtual machine.

Figure 9:
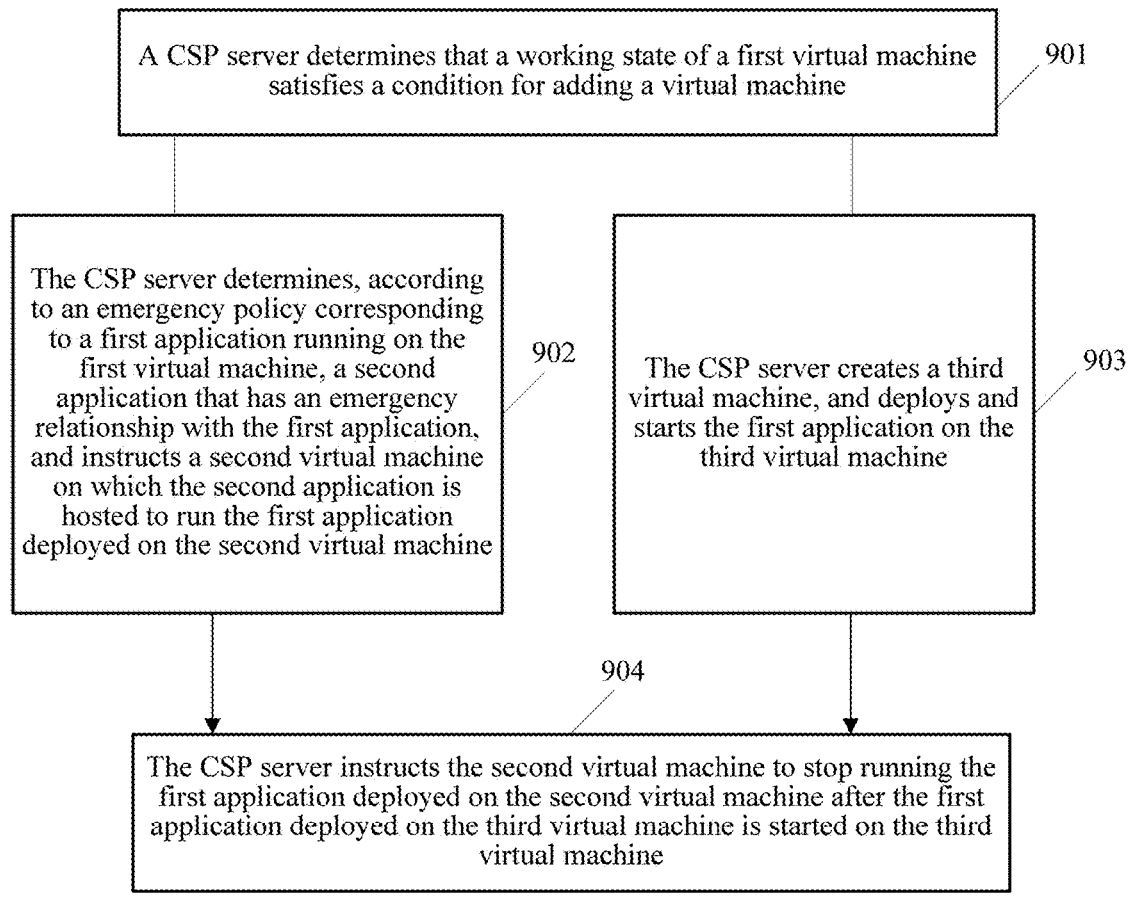
FIG. 9 is a schematic flowchart of a cloud application processing method according to an embodiment of the present disclosure.

Referring to FIG. 9, FIG. 9 is a schematic flowchart of a cloud application processing method according to an embodiment of the present disclosure. As shown in FIG. 9, the cloud application processing method provided in this embodiment of the present disclosure may include the following steps.

Step 901: A CSP server determines that a working state of a first virtual machine satisfies a condition for adding a virtual machine.

The condition for adding a virtual machine may be set according to different scenarios and different needs. For example, the condition for adding a virtual machine may include at least one of the following conditions, a resource utilization rate of the first virtual machine exceeds a first threshold (the first threshold is, for example, 80%, 85%, 90%, or 95%), a throughput per unit time of a first application running on the first virtual machine exceeds a second threshold, and/or a response latency of the first application running on the first virtual machine exceeds a third threshold.

An added virtual machine may also be sometimes referred to as a "pop-up virtual machine." Therefore, the condition for adding a virtual machine may also be sometimes referred to as a "virtual machine pop-up condition."

Step 902: The CSP server determines, according to an emergency policy corresponding to a first application running on the first virtual machine, a second application that has an emergency relationship with the first application, and instructs a second virtual machine on which the second application is hosted to run the first application deployed on the second virtual machine.

For example, the CSP server may send an instruction to the second virtual machine using a remote call interface in order to instruct the second virtual machine on which the second application is hosted to run the first application deployed on the second virtual machine. Certainly, the CSP server may also instruct, in other manner, the second virtual machine on which the second application is hosted to run the first application.

The first application may be any application currently running on the first virtual machine, or the first application may be a particular application currently running on the first virtual machine. For example, the first application may be a user application, a system application, or the like. The second virtual machine is a virtual machine on which the second application that has an emergency relationship with the first application and the first application are deployed.

Step 903: The CSP server creates a third virtual machine, and deploys and starts the first application on the third virtual machine.

Because the second application has an emergency relationship with the first application, the second application may also be referred to as a resource lending application of the first application, and the first application may be referred to as a resource borrowing application (or may be referred to as an application that requests an emergency service) of the second application. The second virtual machine on which the second application is hosted may also be referred to as an emergency virtual machine (or referred to as a resource lending virtual machine) of the first virtual machine because the second virtual machine on which the second application is hosted allows lending a resource to the first virtual machine for use in an emergency. Running the first application on the second virtual machine is to serve an emergency need of the first application running on the first virtual machine (that is, the first application is run on the second virtual machine to temporarily share processing load of the first application running on the first virtual machine). Therefore, the first application deployed on the second virtual machine may be referred to as an emergency application of the first application running on the first virtual machine.

Certainly, in addition to the emergency relationship, there may also be another association relationship between the first application and the second application. For example, there may also be a connection relationship between the first application and the second application.

Step 904: The CSP server instructs the second virtual machine to stop running the first application deployed on the second virtual machine after the first application deployed on the third virtual machine is started on the third virtual machine.

After the CSP server detects that the first application deployed on the third virtual machine has been started on the third virtual machine, or the first application deployed on the third virtual machine is started on the third virtual machine, the third virtual machine may send a notification message to the CSP server in order to notify the CSP server that the first application deployed on the third virtual machine has been started on the third virtual machine.

It is understandable that after the first application deployed on the third virtual machine is started on the third virtual machine, the first application deployed on the third virtual machine and running on the third virtual machine may share the processing load of the first application running on the first virtual machine. In this case, an emergency mission of the first application deployed on the second virtual machine and running on the second virtual machine is completed. Therefore, after the third virtual machine runs the first application deployed on the third virtual machine, the CSP server may instruct the second virtual machine to stop running the first application deployed on the second virtual machine.

The condition for adding a virtual machine may be set according to different scenarios and different needs. For example, the condition for adding a virtual machine may include at least one of the following conditions, a resource utilization rate of the first virtual machine exceeds a first threshold (the first threshold is, for example, 80%, 85%, 90%, or 95%), a throughput per unit time of the first application running on the first virtual machine exceeds a second threshold, and/or a response latency of the first application running on the first virtual machine exceeds a third threshold.

It is understandable that there is no necessary sequence for step 902 and step 903. For example, if the CSP server determines that the working state of the first virtual machine satisfies the condition for adding a virtual machine, the CSP server may synchronously perform, according to a determining result of the CSP server, the step of "determining, according to an emergency policy corresponding to a first application running on the first virtual machine, a second application that has an emergency relationship with the first application, and instructing a second virtual machine on which the second application is hosted to run the first application deployed on the second virtual machine" and the step of "creating a third virtual machine, and deploying and starting the first application on the third virtual machine." It is understandable that the CSP server may also first perform the step of "determining, according to an emergency policy corresponding to a first application running on the first virtual machine, a second application that has an emergency relationship with the first application, and instructing a second virtual machine on which the second application is hosted to run the first application deployed on the second virtual machine." Later on, the CSP server then performs the step of "creating a third virtual machine, and deploying and starting the first application on the third virtual machine."

It may be seen that, in the technical solution of this embodiment, after determining that a working state of a first virtual machine satisfies a condition for adding a virtual machine, a CSP server determines, according to an emergency policy corresponding to a first application running on the first virtual machine, a second application that has an emergency relationship with the first application, and instructs a second virtual machine on which the second application is hosted to run the first application deployed on the second virtual machine, and creates a third virtual machine, and deploys and starts the first application on the third virtual machine. After the third virtual machine runs the first application deployed on the third virtual machine, the CSP server instructs the second virtual machine to stop running the first application deployed on the second virtual machine. An emergency policy between a first application and a second application is introduced, and based on the emergency policy, it may be implemented that a second virtual machine temporarily lends a resource to a first virtual machine. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment of the present disclosure helps improve a utilization rate of virtual machine resources because no standby virtual machine needs to be created in advance. Moreover, a temporary resource lending mechanism between virtual machines is introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

In some embodiments of the present disclosure, several applications (for example, 10 applications) may run on the first virtual machine, and at least one application (for example, 5 applications) of the several applications may each correspond to one emergency policy. For a case in which multiple applications run on the first virtual machine, for every application running on the first virtual machine, the CSP server may perform similar emergency processing in the foregoing manner.

For example, assuming that a fifth application currently runs on the first virtual machine, if the CSP server detects that the working state of the first virtual machine satisfies the condition for adding a virtual machine, the CSP server may further determine, according to an emergency policy corresponding to the fifth application running on the first virtual machine, a sixth application that has an emergency relationship with the fifth application, and instruct a fifth virtual machine on which the sixth application is hosted to run the fifth application deployed on the fifth virtual machine, and create a fourth virtual machine, and deploy and start the fifth application on the fourth virtual machine. After the fourth virtual machine starts the fifth application deployed on the fourth virtual machine, the CSP server instructs the fifth virtual machine to stop running the fifth application deployed on the fifth virtual machine. Running the fifth application on the fifth virtual machine is to serve an emergency need of the fifth application running on the first virtual machine to temporarily share processing load of the fifth application running on the first virtual machine. Therefore, the fifth application deployed on the fifth virtual machine may be referred to as an emergency application of the fifth application running on the first virtual machine.

In some embodiments of the present disclosure, before determining, according to an emergency policy corresponding to a first application running on the first virtual machine, a second application that has an emergency relationship with the first application, the method may further include receiving an application deployment request (for example, an application deployment request from a cloud service client, where the application deployment request may be referred to as an application deployment request related to the first application, where the application deployment request related to the first application means that the application deployment request mainly relates to deployment of the first application, and certainly, the application deployment request may further relate to deployment of another application that has a correlation relationship such as a connection relationship, an emergency relationship, or a host-on relationship with the first application). The application deployment request may carry the emergency policy corresponding to the first application, where the emergency policy corresponding to the first application describes an emergency relationship between K applications. The K applications include the first application and the second application, and K is a positive integer greater than or equal to 2. The first application that has an emergency relationship with the second application may indicate that the first application and the second application serve an emergency need of each other (that is, a virtual machine on which the second application is hosted and a virtual machine on which the first application is hosted may temporarily lend a virtual machine resource to each other), or that the second application serves an emergency need of the first application (that is, a virtual machine on which the second application is hosted may temporarily lend a virtual machine resource to a virtual machine on which the first application is hosted). Likewise, that three applications have an emergency relationship may indicate that the three applications serve an emergency need of each other (that is, virtual machines on which the three applications are hosted may temporarily lend a virtual machine resource to each other), or may indicate that two applications of the three applications (where the two applications do not include the first application, and for example, are the second application and an application APP01) serve an emergency need of the first application, that is, virtual machines on which the two applications (the second application and the application APP01) of the three applications are hosted may temporarily lend a virtual machine resource to the virtual machine on which the first application is hosted. A case in which more applications have an emergency relationship may be deduced by analogy.

In some embodiments of the present disclosure, the application deployment request may carry an application deployment package. The application deployment package may include an application description file. The application description file may include several node templates (the application description file may further include one or more relationship templates), where a different node module corresponds to a different application (for example, a user application or a system application). A node template may include an emergency policy. The emergency policy may describe an emergency relationship between applications. For example, a node template corresponding to the first application may include the emergency policy corresponding to the first application. Further, the emergency policy may further include an emergency trigger condition (certainly, the emergency trigger condition may also be determined by the CSP server, or may be pre-configured in the CSP server, that is, not carried in the application deployment request). For example, instructing a second virtual machine on which the second application is hosted to run the first application deployed on the second virtual machine may include instructing the second virtual machine on which the second application is hosted to run the first application deployed on the second virtual machine when determining that the emergency trigger condition is satisfied. Certainly, the emergency trigger condition may also not exist. If the emergency trigger condition does not exist, the CSP server that instructs the second virtual machine on which the second application is hosted to run the first application deployed on the second virtual machine is not limited by the emergency trigger condition.

The emergency trigger condition may be set according to different scenarios and different needs. For example, the emergency trigger condition may include that a quantity of idle resources of the second virtual machine is greater than or equal to a minimum quantity of resources required to run the first application on the second virtual machine. The minimum quantity of resources required to run the first application on the second virtual machine is equal to a minimum quantity of resources required to run the first application itself on the second virtual machine when the first application does not need to be hosted on another application. The minimum quantity of resources required to run the first application on the second virtual machine is equal to a minimum quantity of resources for running another application on which the first application needs to be hosted on the second virtual machine plus a minimum quantity of resources required to run the first application itself on the second virtual machine when the first application needs to be hosted on the other application. For another example, the emergency trigger condition may include that a quantity of idle resources of the second virtual machine is greater than or equal to a maximum quantity of resources required to run the first application on the second virtual machine. The maximum quantity of resources required to run the first application on the second virtual machine is equal to a maximum quantity of resources required to run the first application itself on the second virtual machine when the first application does not need to be hosted on another application. The maximum quantity of resources required to run the first application on the second virtual machine is equal to a maximum quantity of resources for running another application on which the first application needs to be hosted on the second virtual machine plus a maximum quantity of resources required to run the first application itself on the second virtual machine when the first application needs to be hosted on the other application. For another example, the emergency trigger condition may include that a quantity of idle resources of the second virtual machine is greater than or equal to an average quantity of resources required to run the first application on the second virtual machine. The average quantity of resources required to run the first application on the second virtual machine is equal to an average quantity of resources required to run the first application itself on the second virtual machine when the first application does not need to be hosted on another application. The average quantity of resources required to run the first application on the second virtual machine is equal to an average quantity of resources for running another application on which the first application needs to be hosted on the second virtual machine plus an average quantity of resources required to run the first application itself on the second virtual machine when the first application needs to be hosted on the other application.

A relationship template is used to describe that there is an association relationship between two or more applications, where the association relationship may be a host-on relationship, a connection relationship, or the like. A relationship template describing a host-on relationship between applications may also be referred to as a host-on relationship template, and a relationship template describing a connection relationship between applications may also be referred to as a connection relationship template.

In some embodiments of the present disclosure, if the application deployment request further carries a relationship template (the relationship template may be included in the application description file in the application deployment package carried in the application deployment request), and the relationship template describes that there is a host-on relationship between the first application and a third application, before instructing a second virtual machine on which the second application is hosted to run the first application deployed on the second virtual machine, the method may further include deploying, by the CSP server, on the second virtual machine, the third application that has a host-on relationship with the first application. The host-on relationship, described in the relationship template, between the first application and the third application is that the application is hosted on (HostOn) the third application, or the first application and the third application are hosted on each other.

In some embodiments of the present disclosure, if the application deployment request further carries a second relationship template (the second relationship template may be included in the application description file in the application deployment package carried in the application deployment request), where the second relationship template describes that there is a connection relationship between the first application and a fourth application, and the connection relationship, described in the second relationship template, between the first application and the fourth application is that the first application is connected to the fourth application, before instructing a second virtual machine on which the second application is hosted to run the first application deployed on the second virtual machine, the method may further include connecting, by the CSP server, the first application deployed on the second virtual machine to the fourth application. In addition, if the connection relationship, described in the second relationship template, between the first application and the fourth application is that the first application and the fourth application are mutually connected, before instructing a second virtual machine on which the second application is hosted to run the first application deployed on the second virtual machine, the method may further include instructing, by the CSP server, to establish a mutual connection between the first application deployed on the second virtual machine and the fourth application. In addition, if the connection relationship, described in the second relationship template, between the first application and the fourth application is that the fourth application is connected to the first application, before or after instructing a second virtual machine on which the second application is hosted to run the first application deployed on the second virtual machine, the method may further include instructing, by the CSP server, to connect the fourth application to the first application deployed on the second virtual machine. Connecting the first application to the fourth application generally refers to establishing a communicable relationship between the first application and the fourth application, for example, recording information such as an IP address and a port number that are corresponding to the fourth application into a configuration file of the first application, and so on.

In some embodiments of the present disclosure, before instructing a second virtual machine on which the second application is hosted to run the first application deployed on the second virtual machine, the method may further include deploying, by the CSP server, the first application on the second virtual machine after determining that the second virtual machine has sufficient idle resources for deploying the first application.

In other embodiments of the present disclosure, before instructing a second virtual machine on which the second application is hosted to run the first application deployed on the second virtual machine, the method further includes deploying, by the CSP server, on the second virtual machine, the first application and the application on which the first application is hosted after determining that the second virtual machine has sufficient idle resources for deploying the first application and an application on which the first application is hosted.

In some embodiments of the present disclosure, before instructing a second virtual machine on which the second application is hosted to run the first application deployed on the second virtual machine, the method may further include adding, by the CSP server, some or all processes being running on the second virtual machine to a first process group, and setting a maximum quantity of available resources for the first process group. Optionally, after instructing a second virtual machine on which the second application is hosted to run the first application deployed on the second virtual machine, the method may further include adding, by the CSP server, a process of the first application to a second process group, and setting a maximum quantity of available resources for the second process group. Optionally, after the second virtual machine stops running the first application deployed on the second virtual machine, the method may further include deleting, by the CSP server, the second process group, and dissolving the first process group. It is understandable that introducing a process group and setting a maximum quantity of available resources for the process group help implement performance isolation between an existing process and an emergency process, and further help reduce an adverse effect of implementation of an emergency policy on an existing application. It is understandable that a sum of the maximum quantity of available resources for the second process group and the maximum quantity of available resources for the first process group is less than or equal to a maximum quantity of available resources for the second virtual machine.

For better understanding and implementation of the foregoing solution of this embodiment of the present disclosure, the following introduces examples with reference to some specific application scenarios.

Figure 10:
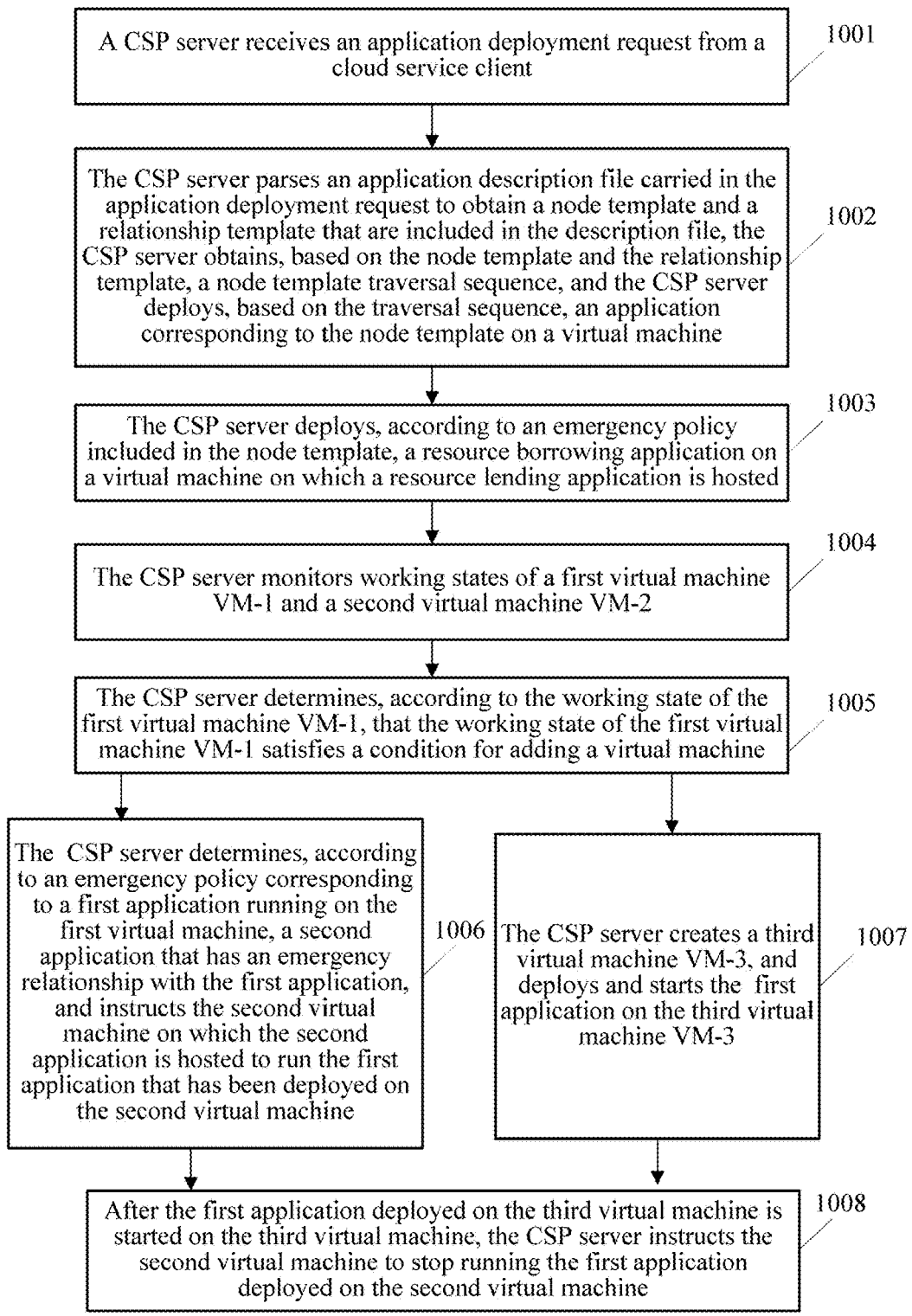
FIG. 10 is a schematic flowchart of a cloud application processing method according to an embodiment of the present disclosure.

Referring to FIG. 10, FIG. 10 is a schematic flowchart of another cloud application processing method according to another embodiment of the present disclosure. As shown in FIG. 10, the other cloud application processing method provided in this embodiment of the present disclosure may include the following steps.

Step 1001: A CSP server receives an application deployment request from a cloud service client.

The application deployment request may carry an application deployment package. The application deployment package includes an application description file. The application description file may include several node templates (for example, may include a node template corresponding to a first application and a node template corresponding to a second application). In addition, the application deployment package may further include one or more relationship templates. A different node template corresponds to a different application (for example, a user application or a system application). For example, if the application deployment package may include five node templates, the five node templates correspond to five applications in a one-to-one manner. A relationship template is used to describe an association relationship (for example, a host-on relationship or a connection relationship) between applications.

The application deployment request relates to deployment of a first application. Therefore, the application deployment request may be referred to as an application deployment request related to the first application, where the application deployment request related to the first application means that the application deployment request relates to the deployment of the first application. Certainly, the application deployment request may further relate to deployment of another application that has a correlation relationship such as a connection relationship, an emergency relationship, or a host-on relationship with the first application.

In addition, the application description file may further include application topology description information. Based on the application topology description information, an application topology diagram may be obtained. The application topology diagram describes a relationship between the node templates in the application description file.

In this embodiment, an example in which a relationship template describes an association relationship between a pair of applications is mainly used. The association relationship may include a host-on relationship, a connection relationship, and the like. For example, if an application APP002 has a connection relationship with four applications, four relationship templates may be used to respectively describe connection relationships between the application APP002 and the four applications. For another example, if an application APP002 has a host-on relationship with two applications, two relationship templates may be used to respectively describe host-on relationships between the application APP002 and the two applications, and so on.

An association relationship described in a relationship template may be a unidirectional association relationship. For example, if a relationship template describes that there is a connection relationship between an application APP002 and an application APP001, and the connection relationship, described in the relationship template, between the application APP002 and the application APP001 is that the application APP002 is connected to the application APP001 indicates that the application APP002 needs to be connected to the application APP001. For another example, if a relationship template describes that there is a host-on relationship between an application APP002 and an application APP001, and the host-on relationship, described in the relationship template, between the application APP002 and the application APP001 is that the application APP002 is hosted on the application APP001 indicates that the application APP001 needs to be deployed on a virtual machine on which the application APP002 is hosted (however, the application APP002 does not need to be necessarily deployed on a virtual machine on which the application APP001 is hosted). In this case, the application APP002 may be referred to as a source application of the host-on relationship, and the application APP001 may be referred to as a destination application of the host-on relationship.

Certainly, the association relationship described in a relationship template may also be a bidirectional association relationship. For example, if a relationship template describes that there is a connection relationship (communicable relationship) between an application APP001 and an application APP002, and the connection relationship, described in the relationship template, between the application APP001 and the application APP002 is that the application APP001 and the application APP002 are mutually connected, it may indicate that the application APP001 needs to be connected to the application APP002, and that the application APP002 also needs to be connected to the application APP001. For another example, if a relationship template describes that there is a host-on relationship between an application APP003 and an application APP002, and the host-on relationship, described in the relationship template, between the application APP003 and the application APP002 is that the application APP003 and the application APP002 are mutually hosted on each other, it indicates that the application APP002 needs to be deployed on a virtual machine on which the application APP003 is hosted, and that the application APP003 also needs to be deployed on a virtual machine on which the application APP002 is hosted.

In this embodiment, an example in which an association relationship (for example, a connection relationship or a host-on relationship) described in a relationship template is a unidirectional association relationship is mainly used.

Further, a relationship template may include an association relationship establishment policy, where the association relationship establishment policy describes how an association relationship is established between applications.

In some embodiments of the present disclosure, a node template corresponding to a particular application may include information such as node type information (that is, type information of the application, where an application type indicated by the type information of the application may be, for example, a database application, an operating system, or a database server application), and a node lifecycle management policy (that is, a lifecycle management policy of the application).

The node lifecycle management policy may include an install policy, a configure policy, a start policy, a stop policy, an uninstall policy, and the like. Names of these node lifecycle management policies are standard names that are recognizable by the CSP server. According to a name of a node lifecycle management policy, the CSP server may determine a management effect generated by the policy. An application running on a virtual machine may be regarded as a service node (which may be referred to as a node for short), where the node may be, for example, a user application or a system application (even a virtual machine operating system or the like).

A node template further includes an emergency policy (for example, a node template corresponding to a first application may include an emergency policy corresponding to the first application). One emergency policy may describe an emergency relationship between several applications. In this embodiment, an example in which one emergency policy describes an emergency relationship between two applications is mainly used. An emergency relationship described in an emergency policy may be unidirectional. For example, an emergency relationship, described in an emergency policy a01, between a second application and a first application includes that the second application is a resource lending application of the first application (that is, indicating that a virtual machine on which the second application is hosted may temporarily lend a virtual machine resource to a virtual machine on which the first application is hosted), an emergency relationship, described in an emergency policy a02, between a second application and a first application includes that the first application is a resource lending application of the second application (that is, indicating that a virtual machine on which the first application is hosted may temporarily lend a virtual machine resource to a virtual machine on which the second application is hosted). In addition, an emergency relationship described in an emergency policy may also be bidirectional. For example, an emergency relationship, described in an emergency policy a03, between a third application and a first application may be that the third application and the first application are resource lending applications of each other (that is, indicating that a virtual machine on which a third application is hosted and a virtual machine on which the first application is hosted may temporarily lend a virtual machine resource to each other).

In order to simplify description, the following is mainly described using an example in which the application deployment package includes a first node template, a second node template, a third node template, and a fourth node template, where the first node template is a node template corresponding to a first application, the second node template is a node template corresponding to a second application, the third node template is a node template corresponding to a third application, and the fourth node template is a node template corresponding to a fourth application. The application deployment package further includes a first relationship template, a second relationship template, and a third relationship template.

The first relationship template describes that the first application needs to be hosted on the third application (that is, the third application needs to be deployed on a virtual machine on which the first application is hosted). The second relationship template describes that the second application needs to be hosted on the fourth application (that is, the fourth application needs to be deployed on a virtual machine on which the second application is hosted). The node template corresponding to the first application further includes an emergency policy corresponding to the first application, where the emergency policy corresponding to the first application describes that the second application is a resource lending application of the first application, that is, the virtual machine on which the second application is hosted may temporarily lend a resource to the virtual machine on which the first application is hosted. The third relationship template further describes that there is a connection relationship between the third application and the fourth application, which indicates that the third application is connected to the fourth application.

Further, the emergency policy corresponding to the first application may further include an emergency trigger condition (certainly, the emergency trigger condition may also be determined by the CSP server, or may be pre-configured in the CSP server, that is, the emergency trigger condition is not carried in the application deployment request). For example, instructing a second virtual machine on which the second application is hosted to run the first application deployed on the second virtual machine may include instructing the second virtual machine on which the second application is hosted to run the first application deployed on the second virtual machine when determining that the emergency trigger condition is satisfied. It is understandable that after the second virtual machine on which the second application is hosted is instructed to run the first application deployed on the second virtual machine, both the second virtual machine and a first virtual machine run the first application. Running, on the second virtual machine, the first application deployed on the second virtual machine is to serve an emergency need of the first application running on the first virtual machine. Therefore, the first application deployed on the second virtual machine may be referred to as an emergency application of the first application running on the first virtual machine.

The emergency trigger condition may be set according to different scenarios and different needs. For example, the emergency trigger condition may include that a quantity of idle resources of the second virtual machine is greater than or equal to a minimum quantity of resources required to run the first application on the second virtual machine (because the first application needs to be hosted on the third application, the minimum quantity of resources required to run the first application on the second virtual machine may be equal to a minimum quantity of resources for running, on the second virtual machine, the third application on which the first application needs to be hosted plus a minimum quantity of resources required to run the first application itself on the second virtual machine). For another example, the emergency trigger condition may include that a quantity of idle resources of the second virtual machine is greater than or equal to a maximum quantity of resources required to run the first application on the second virtual machine (because the first application needs to be hosted on the third application, the maximum quantity of resources required to run the first application on the second virtual machine may be equal to a maximum quantity of resources for running, on the second virtual machine, the third application on which the first application needs to be hosted plus a maximum quantity of resources required to run the first application itself on the second virtual machine). For another example, the emergency trigger condition may include that a quantity of idle resources of the second virtual machine is greater than or equal to an average quantity of resources required to run the first application on the second virtual machine (because the first application needs to be hosted on the third application, the average quantity of resources required to run the first application on the second virtual machine may be equal to an average quantity of resources for running, on the second virtual machine, the third application on which the first application needs to be hosted plus an average quantity of resources required to run the first application itself on the second virtual machine).

Step 1002: The CSP server parses an application description file carried in the application deployment request to obtain a node template and a relationship template that are included in the description file. The CSP server obtains, based on the node template and the relationship template, a node template traversal sequence. The CSP server deploys, based on the traversal sequence, an application corresponding to the node template on a virtual machine.

For example, the CSP server may obtain an application topology diagram (each node in the application topology diagram corresponds to a node template) according to application topology description information included in the application description file, and reversely call a graph traversal algorithm according to an arrow direction in the application topology diagram to obtain a node template sequence by means of calculation. Certainly, the CSP server may also directly obtain the node template sequence by means of calculation according to the application topology description information included in the application description file, without the need to perform the step of obtaining, based on application topology description information, an application topology diagram.

In addition, the CSP server may further record the node template sequence into a database.

The CSP server calculates a quantity of virtual machines required for application deployment, and determines an application that needs to be deployed on each virtual machine. According to the node template sequence, the CSP server deploys the applications, establishes association relationships between applications, starts the applications, and performs the like on the virtual machines in sequence by calling corresponding node lifecycle management policies and association relationship establishment policies.

A manner used by the CSP server to calculate the quantity of virtual machines required for application deployment includes searching for such a node template in the application topology diagram that an application corresponding to the node template is not a source application of a HostOn relationship described in any HostOn relationship template, that is, the node template is at a bottom layer of the application topology diagram, where a quantity of such node templates found is the quantity of virtual machines required for application deployment. The CSP server may determine, according to a HostOn relationship, which applications need to be deployed on a same virtual machine (applications having a HostOn relationship need to be deployed on a same virtual machine), and acquire a corresponding quantity of virtual machines from virtual machines managed by the CSP server (each virtual machine managed by the CSP server has a virtual machine identifier (ID) that uniquely identifies the virtual machine). Using a Declarative Mode-based deployment policy, the CSP server deploys the applications on the virtual machines, and may further start the deployed applications.

In some embodiments of the present disclosure, when the CSP server calls a node lifecycle management policy in a node template to deploy an application, if a node lifecycle management policy whose policy name is install is executed, the CSP server installs a deployment artifact of an application corresponding to the node template. The CSP server may configure an application corresponding to the node template if a node lifecycle management policy whose policy name is configure is run. The CSP server starts an application corresponding to the node template if a node lifecycle management policy whose policy name is start is run. Similarly, the CSP server stops running an application corresponding to the node template if a node lifecycle management policy whose policy name is stop, is run. The CSP server uninstalls a deployment artifact of an application corresponding to the node template if a node lifecycle management policy whose policy name is uninstall is run.

For example, an application corresponding to the node template may be deployed by first executing the install policy and then executing the configure policy when a node lifecycle management policy in a node template includes an install policy and a configure policy. For example, when a node lifecycle management policy in a node template includes an install policy, a configure policy, and a start policy, an application corresponding to the node template may be deployed by first executing the install policy, then executing the configure policy, and finally executing the start policy.

The CSP server may further establish an association relationship between applications according to an association relationship establishment policy included in a relationship template. For example, if a relationship type between applications is ConnectTo, and an association relationship establishment policy includes connect or disconnect, the CSP server may establish a connection relationship between the applications or disconnect the connection relationship between the applications. After two applications having a particular association relationship (for example, a ConnectTo relationship) are deployed, an association relationship establishment policy may be called to establish the association relationship between the two applications. For example, the CSP server may call a connect policy provided in a ConnectTo relationship template to establish the connection relationship between the two applications.

For example, the CSP server deploys the first application and the third application on a first virtual machine VM-1, deploys the second application and the fourth application on a second virtual machine VM-2, and instructs to establish a connection from the third application to the fourth application.

After deploying an application corresponding to each node template in the application deployment package, the CSP server records, into the database, information such as a node template ID, an application ID of an application corresponding to the node template ID, a virtual machine ID of a virtual machine on which the application is hosted, an amount of disk space consumed for installing the application corresponding to the node template.

Step 1003: The CSP server deploys, according to an emergency policy included in the node template, a resource borrowing application on a virtual machine on which a resource lending application is hosted. For example, according to an emergency policy included in a node template corresponding to a first application, the first application (that is, a resource borrowing application) may be deployed on a second virtual machine VM-2 on which a resource lending application (that is, the second application) of the first application is hosted. The first application deployed on the second virtual machine VM-2 may be referred to as an emergency application of the first application deployed on the first virtual machine VM-1.

For each pair of applications having an emergency relationship (for example, the first application and the second application that have an emergency relationship), the CSP server searches a database for a virtual machine ID (for example, VM-1) of a virtual machine on which a deployed resource borrowing application (for example, the first application) is hosted, searches the database for disk space that needs to be consumed for deploying the resource borrowing application (for example, the first application), and the like, and checks whether remaining disk space on a virtual machine (for example, VM-2) on which a resource lending application (for example, the second application) is hosted is sufficient to deploy the resource borrowing application (for example, the first application). The CSP server deploys, based on a Declarative Mode policy, the resource borrowing application (for example, the first application) on the virtual machine (for example, VM-2) on which the resource lending application (for example, the second application) is hosted if the remaining disk space on the virtual machine (for example, VM-2) on which the resource lending application (for example, the second application) is hosted is sufficient, and the resource borrowing application (for example, the first application) may not be deployed on the virtual machine (for example, VM-2) on which the resource lending application (for example, the second application) is hosted if the remaining disk space on the virtual machine (for example, VM-2) on which the resource lending application (for example, the second application) is hosted is not sufficient.

Further, because the first application needs to be hosted on a third application, the CSP server may further search the database for disk space that needs to be consumed for deploying the third application, and the like, and check whether the remaining disk space on the virtual machine (for example, VM-2) on which the resource lending application (for example, the second application) is hosted is sufficient to deploy the resource borrowing application (for example, the first application) and the third application. The CSP server deploys, based on the Declarative Mode policy, the resource borrowing application (for example, the first application) and the third application on the virtual machine (for example, VM-2) on which the resource lending application (for example, the second application) is hosted if the remaining disk space on the virtual machine (for example, VM-2) on which the resource lending application (for example, the second application) is hosted is sufficient, and the resource borrowing application (for example, the first application) and the third application may not be deployed on the virtual machine (for example, VM-2) on which the resource lending application (for example, the second application) is hosted if the remaining disk space on the virtual machine (for example, VM-2) on which the resource lending application (for example, the second application) is hosted is not sufficient.

After the resource borrowing application (for example, the first application) is deployed on the virtual machine (for example, VM-2) on which the resource lending application (for example, the second application) is hosted, that is, after an emergency application of the first application that is hosted on the first virtual machine VM-1 is deployed on the second virtual machine VM-2, the emergency application does not need to be started, and the emergency application only needs to be installed and configured on the second virtual machine VM-2.

Further, after deploying the emergency application of the first application on the second virtual machine VM-2, the CSP server further deploys, for example, on the virtual machine VM-2, another application (the third application) on which the first application needs to be hosted. Certainly, the remaining disk space on the second virtual machine VM-2 also needs to be sufficient to deploy the other application on which the first application needs to be hosted.

Further, after deploying the emergency application of the first application on the second virtual machine VM-2, the CSP server may record, into the database, information such as a node template ID corresponding to the emergency application, an application ID of the emergency application, a virtual machine ID of a virtual machine (the second virtual machine VM-2) on which the emergency application is hosted, and a current state of the emergency application. In this case, the emergency application is not started yet. Therefore, the current state of the emergency application is a "standby" state.

So far, based on the received application deployment request, the CSP server has completed related deployment operations of related applications.

Step 1004: The CSP server monitors working states of a first virtual machine VM-1 and a second virtual machine VM-2.

After a first application and a third application that are deployed on the first virtual machine VM-1 are started, and after a second application and a fourth application that are deployed on the second virtual machine VM-2 are started, the CSP server monitors the working states of the first virtual machine VM-1 and the second virtual machine VM-2.

Step 1005: The CSP server determines, according to the working state of the first virtual machine VM-1, that the working state of the first virtual machine VM-1 satisfies a condition for adding a virtual machine.

The condition for adding a virtual machine may be set according to different scenarios and different needs. For example, the condition for adding a virtual machine may include at least one of the following conditions that a resource utilization rate of the first virtual machine exceeds a first threshold (the first threshold is, for example, 80%, 85%, 90%, or 95%), that a throughput per unit time of the first application running on the first virtual machine exceeds a second threshold, that a response latency of the first application running on the first virtual machine exceeds a third threshold, or the like.

Step 1006: The CSP server determines, according to an emergency policy corresponding to a first application running on the first virtual machine, a second application that has an emergency relationship with the first application, and instructs the second virtual machine on which the second application is hosted to run the first application that has been deployed on the second virtual machine (that is, instructs the second virtual machine on which the second application is hosted to run the emergency application of the first application running on the first virtual machine).

Further, the CSP server searches, based on a determining result that the working state of the first virtual machine VM-1 satisfies the condition for adding a virtual machine in step 1005, a database for the emergency policy corresponding to the first application running on the first virtual machine, and the CSP server determines, according to the found emergency policy, the second application that has an emergency relationship with the first application, and instructs the second virtual machine on which the second application is hosted to run the first application deployed on the second virtual machine.

For example, the CSP server may send an instruction to the second virtual machine using a remote call interface in order to instruct the second virtual machine on which the second application is hosted to run the first application deployed on the second virtual machine. Certainly, the CSP server may also instruct, in another manner, the second virtual machine on which the second application is hosted to run the first application deployed on the second virtual machine.

Step 1007: The CSP server creates a third virtual machine VM-3, and deploys and starts the first application on the third virtual machine VM-3.

Further, because the first application is hosted on a third application, before instructing the third virtual machine VM-3 to run the first application deployed on the third virtual machine VM-3, the CSP server further deploys the third application on the third virtual machine VM-3, and establishes a connection between the third application deployed on the third virtual machine VM-3 and a fourth application deployed on the second virtual machine VM-2.

Further, after deploying and starting the first application and the third application on the third virtual machine VM-3, the CSP server may record, into the database, information such as a node template ID corresponding to the first application running on the third virtual machine VM-3, a node template ID corresponding to the third application, an application ID of the first application, an application ID of the third application, a virtual machine ID of the virtual machine VM-3 on which the third application and the first application are hosted, and an amount of disk space consumed for installing the third application and the first application. The CSP server sets, in the database, states of the first application and the third application that are deployed on the third virtual machine, as "running."

It is understandable that there is no necessary sequence for step 1006 and step 1007. For example, if the CSP server determines that the working state of the first virtual machine satisfies the condition for adding a virtual machine, the CSP server may synchronously perform the step of "determining, according to an emergency policy corresponding to a first application running on the first virtual machine, a second application that has an emergency relationship with the first application, and instructing the second virtual machine on which the second application is hosted to run the first application deployed on the second virtual machine" and the step of "creating a third virtual machine VM-3, and deploying and starting the first application on the third virtual machine VM-3." It is understandable that the CSP server may also first perform the step of "determining, according to an emergency policy corresponding to a first application running on the first virtual machine, a second application that has an emergency relationship with the first application, and instructing a second virtual machine on which the second application is hosted to run the first application deployed on the second virtual machine," later on, the CSP server then performs the step of "creating a third virtual machine VM-3, and deploying and starting the first application on the third virtual machine VM-3."

Step 1008: After the third virtual machine runs the first application deployed on the third virtual machine, the CSP server instructs the second virtual machine to stop running the first application deployed on the second virtual machine.

Further, because the CSP server also deploys, on the second virtual machine, the third application that has a host-on relationship with the first application, the CSP server may further instruct the second virtual machine to stop running the third application deployed on the second virtual machine.

In some embodiments of the present disclosure, before instructing the second virtual machine on which the second application is hosted to run the first application deployed on the second virtual machine, the method may further include adding, by the CSP server, some or all processes being running on the second virtual machine to a first process group, and setting a maximum quantity of available resources for the first process group. Optionally, after instructing the second virtual machine on which the second application is hosted to run the first application deployed on the second virtual machine, the method may further include adding, by the CSP server, a process of the first application to a second process group, and setting a maximum quantity of available resources for the second process group. Optionally, after the second virtual machine stops running the first application deployed on the second virtual machine, the method may further include deleting, by the CSP server, the second process group, and dissolving the first process group. It is understandable that introducing a process group and setting a maximum quantity of available resources for the process group help implement performance isolation between an existing process and an emergency process, and further help reduce an adverse effect of implementation of an emergency policy on an existing application. It is understandable that a sum of the maximum quantity of available resources for the second process group and the maximum quantity of available resources for the first process group is less than or equal to a maximum quantity of available resources for the second virtual machine.

It may be seen that, in the technical solution of this embodiment, after determining that a working state of a first virtual machine satisfies a condition for adding a virtual machine, a CSP server determines, according to an emergency policy corresponding to a first application running on the first virtual machine, a second application that has an emergency relationship with the first application, and instructs a second virtual machine on which the second application is hosted to run the first application deployed on the second virtual machine, and creates a third virtual machine, and deploys and starts the first application on the third virtual machine. After the third virtual machine runs the first application deployed on the third virtual machine, the CSP server instructs the second virtual machine to stop running the first application deployed on the second virtual machine. An emergency policy between a first application and a second application is introduced, and based on the emergency policy, it may be implemented that a second virtual machine temporarily lends a resource to a first virtual machine. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment of the present disclosure helps improve a utilization rate of virtual machine resources because no standby virtual machine needs to be created in advance. Moreover, a temporary resource lending mechanism between virtual machines is introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

For better understanding and implementation of the foregoing solution of this embodiment of the present disclosure, the following introduces examples with reference to some more specific Topology and Orchestration Specification for Cloud Applications (TOSCA)-based application scenarios.

It is assumed that a CSP server receives an application deployment request q1 from a cloud service client.

The application deployment request q1 carries an application deployment package. The application deployment package includes an application description file. The application description file includes the following six node templates, a node template aVM, a node template dVM, a node template appContainer, a node template dbContainer, a node template DB, and a node template App. The application description file further includes four relationship templates whose types are HostOn and one relationship template whose type is ConnectTo. The six node templates correspond to six applications. Application IDs of the six applications are respectively as follows, appVM1, dbVM, appC1, dbC, db, and app1, where the node template aVM corresponds to the application appVM1, the node template dVM corresponds to the application app dbVM, the node template appContainer corresponds to the application appC1, the node template dbContainer corresponds to the application dbC, the node template DB corresponds to the application db, and the node template App corresponds to the application app1.

Figure 11:
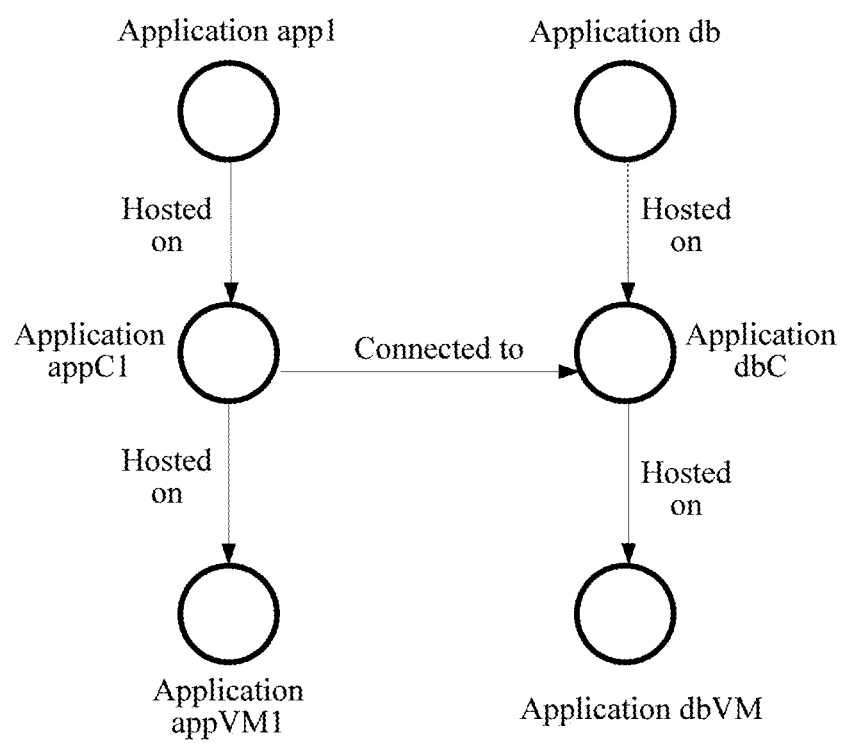
FIG. 11 is a schematic structural diagram of an application topology according to an embodiment of the present disclosure.

An application topology diagram obtained based on application topology description information included in the application description file may be shown in FIG. 11. FIG. 11 shows a sequence of the node template aVM, the node template dVM, the node template appContainer, the node template dbContainer, the node template DB, and the node template App.

In addition, the CSP server may further record the sequence of the node templates into a database. FIG. 11 shows that the application db is hosted on the application dbC, the application dbC is hosted on the app dbVM, the application app1 is hosted on the application appC1, and the application appC1 is hosted on the application appVM1. FIG. 11 further shows that the application appC1 is connected to the application dbC.

The CSP server calculates a quantity of virtual machines required to deploy the six applications, and determines an application that needs to be deployed on each virtual machine. According to the sequence of the node templates, the CSP server deploys the applications and starts the applications on the virtual machines in sequence by calling corresponding node lifecycle management policies, and establishes a connection from the application appC1 to the application dbC by calling an association relationship establishment policy.

A manner used by the CSP server to calculate the quantity virtual machines required for application deployment includes searching for such a node template in the application topology diagram that an application corresponding to the node template is not a source application of a HostOn relationship described in any HostOn relationship template, that is, the node template is at a bottom layer of the application topology diagram (that is, the node template aVM and the node template dVM), where a quantity of such node templates found is the quantity of virtual machines required for application deployment. Therefore, two virtual machines are required to deploy the six applications. The CSP server may determine, according to a HostOn relationship, which applications need to be deployed on a same virtual machine (applications having a HostOn relationship need to be deployed on a same virtual machine), and acquire a corresponding quantity of virtual machines from virtual machines managed by the CSP server (each virtual machine managed by the CSP server has a virtual machine ID that uniquely identifies the virtual machine).

It is assumed that available disk space of two virtual machines created by the CSP server is shown in Table 1.

TABLE 1

| Virtual machine ID | Available disk space |
| --- | --- |
| VM_1 | 20 gigabytes (GB) |
| VM_2 | 20 GB |

Mapping relationships among the node templates, the applications, and the virtual machines may be shown in Table 2.

TABLE 2

| Node template ID | Application ID | Virtual machine ID | State |
| --- | --- | --- | --- |
| aVM | appVM1 | VM-1 | To be deployed |
| dVM | dbVM | VM-2 | To be deployed |
| appContainer | appC1 | VM-1 | To be deployed |
| dbContainer | dbC | VM-2 | To be deployed |
| DB | db | VM-2 | To be deployed |
| App | app1 | VM-1 | To be deployed |

Using a Declarative Mode-based deployment policy, the CSP server deploys the applications on the virtual machines, and may further start some or all of the deployed applications.

A specific deployment procedure may be as follows.

Step S1: Start the applications appVM1 and dbVM: start appVM1, start dbVM.

Step S2: Deploy and start the application appC1: install appC1, configure appC1, start appC1.

Step S3: Deploy and start the application dbC: install dbC, configure dbC, start dbC.

Step S4: Establish a connection relationship between the application appC1 and the application dbC: connect appC1 to dbC.

Step S5: Deploy and start the application app1: install app1, start app1.

Step S6: Deploy and start the application db: install db, start db.

The application appVM1, the application appC1, and the application app1 are deployed on the first virtual machine VM-1. The application dbVM, the application dbC, and the application db are deployed on the second virtual machine VM-2. After deploying and starting the applications, the CSP server sets states of the applications to "running," which may be further shown in Table 3.

TABLE 3

| Node template ID | Application ID | Virtual machine ID | State |
| --- | --- | --- | --- |
| aVM | appVM1 | VM-1 | Running |
| dVM | dbVM | VM-2 | Running |
| appContainer | appC1 | VM-1 | Running |
| dbContainer | dbC | VM-2 | Running |
| DB | db | VM-2 | Running |
| App | app1 | VM-1 | Running |

Disk space consumed by the applications is shown in Table 4.

TABLE 4

| Application ID | Disk space consumed |
| --- | --- |
| appVM1 | — |
| dbVM | — |
| appC1 | 200 megabytes (MB) |
| dbC | 4 GB |
| db | 5 GB |
| app1 | 50 MB |

The CSP server deploys, according to an emergency policy included in the node template App, the resource borrowing application app1 on the virtual machine VM-2 on which the resource lending application db is hosted. The application app1 deployed on the second virtual machine VM-2 may be referred to as an emergency application of the application app1 deployed on the first virtual machine VM-1.

For the application db and the application app1 that have an emergency relationship, the CSP server searches Table 4 for disk space that needs to be consumed for deploying the application app1, and the like, and checks whether remaining disk space on the second virtual machine VM-2 on which the application db is hosted is sufficient to deploy the application App1. Because the application App1 needs to be hosted on the application appC1, the CSP server further searches Table 4 for disk space that needs to be consumed for deploying the application appC1, and checks whether the remaining disk space on the second virtual machine VM-2 on which the application db is hosted is sufficient to deploy the application app1 and the application appC1. It may be known from Table 4 and Table 1 that the remaining disk space on the second virtual machine VM-2 is 11 GB, and only 250 MB is required to deploy the application app1 and the application appC1. Therefore, the remaining disk space on the second virtual machine VM-2 on which the application db is hosted is sufficient to deploy the application app1 and the application appC1.

Therefore, the CSP server also deploys the application app1 and the application appC1 on the second virtual machine VM-2. A procedure of deploying the application app1 and the application appC1 on the second virtual machine VM-2 by the CSP server may be as follows.

Step S11: Deploy and start the application appC1: install appC1, configure appC1, start appC1.

Step S12: Establish a connection relationship between the application appC1 and the application dbC: connect appC1 to dbC.

Step S13: Deploy and start the application app1: install app1, start app1.

After deploying the application app1 and the application appC1 on the second virtual machine VM-2, the CSP server sets states of the application app1 and the application appC1 to "standby", which may be further shown in Table 5.

TABLE 5

| Node template ID | Application ID | Virtual machine ID | State |
|---|---|---|---|
| aVM | appVM1 | VM_1 | Running |
| dVM | dbVM | VM_2 | Running |
| appContainer | appC1 | VM_1 | Running |
| dbContainer | dbC | VM_2 | Running |
| DB | db | VM_2 | Running |
| App | app1 | VM_1 | Running |
| appContainer | appC1 | VM_2 | Standby |
| App | app1 | VM_2 | Standby |

So far, based on the received application deployment request, the CSP server has completed related deployment operations of related applications.

The CSP server monitors working states of the first virtual machine VM-1 and the second virtual machine VM-2.

The CSP server determines, according to an emergency policy corresponding to the application app1 currently running on the first virtual machine, the application db that has an emergency relationship with the application app1, and instructs the second virtual machine VM-2 on which the application db is hosted to run the application app1 deployed on the second virtual machine VM-2 (that is, instructs the second virtual machine VM-2 on which the application db is hosted to run the emergency application app1 of the application app1) if detecting that the working state of the first virtual machine VM-1 satisfies a condition for adding a virtual machine.

The condition for adding a virtual machine may be set according to different scenarios and different needs. For example, the condition for adding a virtual machine may include at least one of the following conditions, a resource utilization rate of the first virtual machine exceeds a first threshold (the first threshold is, for example, 80%, 85%, 90%, or 95%), a throughput per unit time of the application app1 running on the first virtual machine exceeds a second threshold, and a response latency of the application app1 running on the first virtual machine exceeds a third threshold, or the like.

The CSP server further creates a third virtual machine VM-3, and deploys and starts the application app1 on the third virtual machine VM-3 if the CSP server determines that the working state of the first virtual machine VM-1 satisfies the condition for adding a virtual machine.

Further, because the application app1 is hosted on the application appC1, before instructing the third virtual machine VM-3 to run the application app1 deployed on the third virtual machine VM-3, the CSP server further deploys the application appC1 on the third virtual machine VM-3, and establishes a connection between the application appC1 deployed on the third virtual machine VM-3 and the application dbC deployed on the second virtual machine VM-2.

Further, because the application appC1 is hosted on the application appVM1, before instructing the third virtual machine VM-3 to run the application app1 deployed on the third virtual machine VM-3, the CSP server further deploys the application appVM1 on the third virtual machine VM-3.

In a procedure of performing the operation of adding the third virtual machine by the CSP server, working states of the application appVM1, the application appC1, and the application app1 that are being deployed on the third virtual machine VM-3 are shown in Table 6.

TABLE 6

| Node template ID | Application ID | Virtual machine ID | State |
|---|---|---|---|
| aVM | appVM1 | VM_1 | Running |
| dVM | dbVM | VM_2 | Running |
| appContainer | appC1 | VM_1 | Running |
| dbContainer | dbC | VM_2 | Running |
| DB | db | VM_2 | Running |
| App | app1 | VM_1 | Running |
| appContainer | appC1 | VM_2 | Running |
| App | app1 | VM_2 | Running |
| appContainer | appC1 | VM_3 | Newly added |
| App | app1 | VM_3 | Newly added |
| aVM | appVM1 | VM_3 | Newly added |

After the operation of adding the third virtual machine VM-3 is completed, that is, after the third virtual machine VM-3 runs the application app1 deployed on the third virtual machine VM-3, the CSP server instructs the second virtual machine VM-2 to stop running the application app1 deployed on the second virtual machine VM-2. Further, because the CSP server further deploys, on the second virtual machine VM-2, the application appC1 that has a host-on relationship with the application app1, the CSP server may further instruct the second virtual machine VM-2 to stop running the application appC1 deployed on the second virtual machine VM-2. In this case, the application appC1 and the application app1 that are deployed on the second virtual machine VM-2 are set to a "standby" state, but the application appC1, the application app1, and the application appVM1 that are deployed on the third virtual machine VM-3 are set to a "running" state. Details are shown in Table 7.

TABLE 7

| Node template ID | Application ID | Virtual machine ID | State |
|---|---|---|---|
| aVM | appVM1 | VM_1 | Running |
| dVM | dbVM | VM_2 | Running |
| appContainer | appC1 | VM_1 | Running |
| dbContainer | dbC | VM_2 | Running |
| DB | db | VM_2 | Running |
| App | app1 | VM_1 | Running |
| appContainer | appC1 | VM_2 | Standby |
| App | app1 | VM_2 | Standby |
| app Container | appC1 | VM_3 | Running |
| App | app1 | VM_3 | Running |
| aVM | appVM1 | VM_3 | Running |

Figure 12:
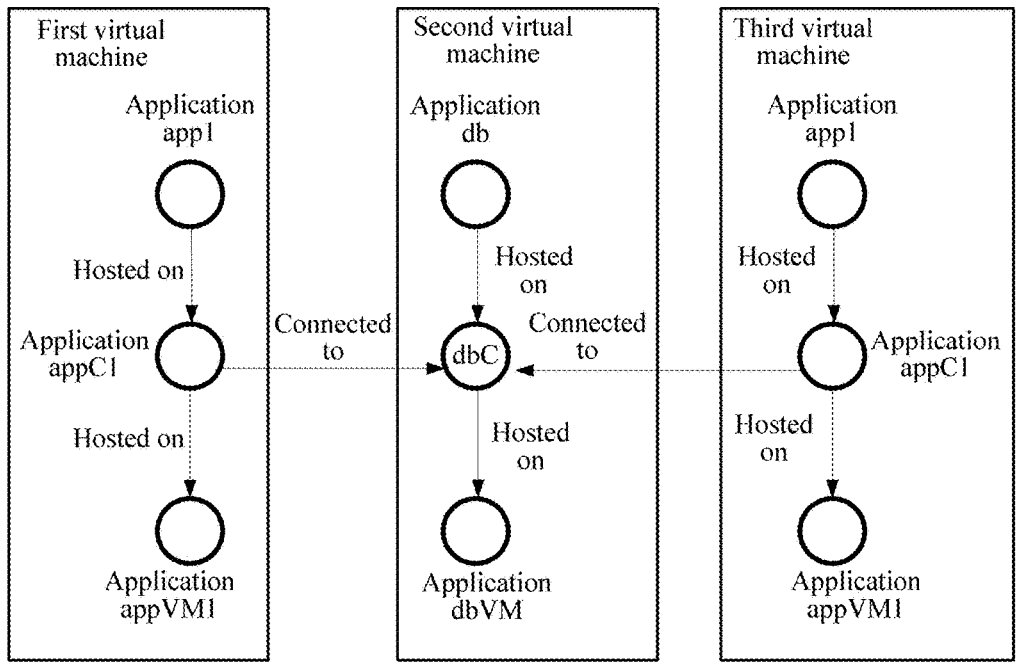
FIG. 12 is a schematic structural diagram of a topology of applications deployed on a virtual machine according to an embodiment of the present disclosure.

After the CSP server newly adds the third virtual machine, applications running on the three virtual machines may be shown in FIG. 12, where both the third virtual machine and the first virtual machine run the application appC1, the application app1, and the application appVM1.

It may be seen that, in the foregoing application scenario, if determining that a working state of a first virtual machine satisfies a condition for adding a virtual machine, a CSP server may determine, according to an emergency policy corresponding to an application app1 currently running on the first virtual machine, an application db having an emergency relationship with the application app1, and instruct a second virtual machine on which the application db is hosted to run the application app1 deployed on the second virtual machine VM-2. If determining that the working state of the first virtual machine satisfies the condition for adding a virtual machine, the CSP server creates a third virtual machine, and deploys and starts the application app1 on the third virtual machine. After the third virtual machine runs the application app1 deployed on the third virtual machine VM-3, the CSP server instructs the second virtual machine to stop running the application app1 deployed on the second virtual machine VM-2. An emergency policy between applications is introduced, and based on the emergency policy, it may be implemented that a second virtual machine temporarily lends a resource to a first virtual machine. Therefore, a new virtual machine may be created only when a working state of the first virtual machine satisfies a condition for adding a virtual machine. Compared with the prior-art mechanism in which a virtual machine is created in advance when an application is deployed, the solution of this embodiment of the present disclosure helps improve a utilization rate of virtual machine resources because no virtual machine needs to be created in advance. Moreover, a temporary resource lending mechanism between virtual machines is introduced when a working state of a first virtual machine satisfies a condition for adding a virtual machine. Therefore, an emergency virtual machine may temporarily share processing load of an application app1 running on the first virtual machine before a newly created virtual machine is deployed. This helps greatly reduce service fluctuation caused in a procedure of newly creating a virtual machine, and helps improve reliability of a cloud service.

Figure 13:
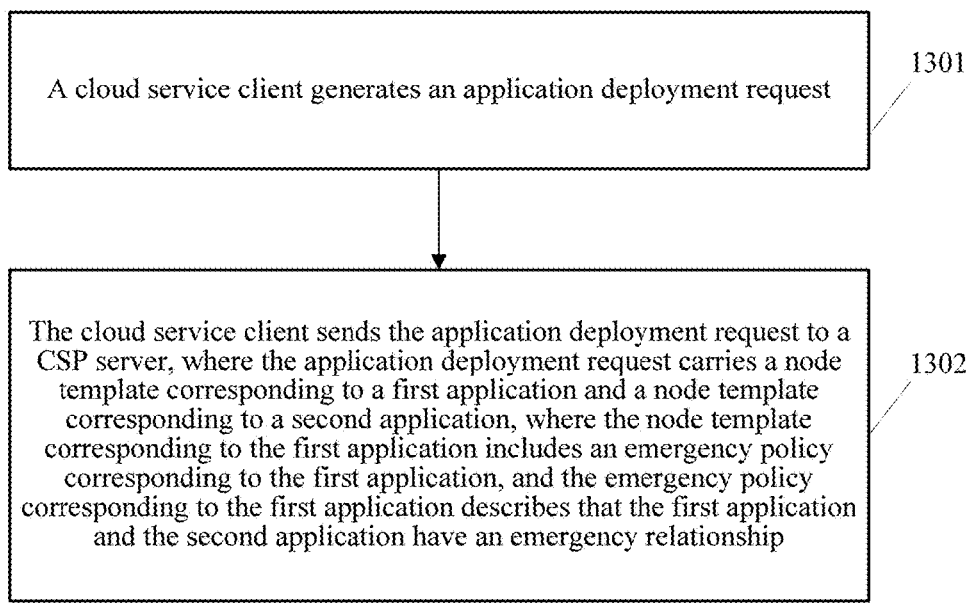
FIG. 13 is a schematic flowchart of a cloud application deployment method according to an embodiment of the present disclosure.

Referring to FIG. 13, an embodiment of the present disclosure further provides a cloud application deployment method, which may include the following steps.

Step 1301: A cloud service client generates an application deployment request.

Step 1302: The cloud service client sends the application deployment request to a CSP server, where the application deployment request carries a node template corresponding to a first application and a node template corresponding to a second application, where the node template corresponding to the first application includes an emergency policy corresponding to the first application, and the emergency policy corresponding to the first application describes that the first application has an emergency relationship with the second application.

After receiving the application deployment request, the CSP server may create a first virtual machine and a second virtual machine, deploy the first application on the first virtual machine according to the node template corresponding to the first application, deploy the second application on the second virtual machine according to the node template corresponding to the second application, and deploy, according to the emergency policy corresponding to the first application, the first application on the second virtual machine on which the second application is hosted. Subsequently, the CSP server determines that a working state of the first virtual machine satisfies a condition for adding a virtual machine, determines, according to the emergency policy corresponding to the first application running on the first virtual machine, the second application that has an emergency relationship with the first application, and instructs the second virtual machine on which the second application is hosted to run the first application deployed on the second virtual machine, creates a third virtual machine, and deploys and starts the first application on the third virtual machine, and instructs the second virtual machine to stop running the first application after the first application is started on the third virtual machine.

In some embodiments of the present disclosure, the application deployment request further carries a host-on relationship template, where a host-on relationship, described in the host-on relationship template, between the first application and a third application is that the first application is hosted on the third application, or a host-on relationship, described in the host-on relationship template, between the first application and a third application is that the first application and the third application are mutually hosted on each other.

Further, the emergency policy corresponding to the first application may further include an emergency trigger condition.

The emergency trigger condition may be set according to different scenarios and different needs. For example, the emergency trigger condition may include that a quantity of idle resources of the second virtual machine is greater than or equal to a minimum quantity of resources required to run the first application on the second virtual machine. The minimum quantity of resources required to run the first application on the second virtual machine is equal to a minimum quantity of resources required to run the first application itself on the second virtual machine when the first application does not need to be hosted on another application. The minimum quantity of resources required to run the first application on the second virtual machine is equal to a minimum quantity of resources for running another application on which the first application needs to be hosted on the second virtual machine plus a minimum quantity of resources required to run the first application itself on the second virtual machine when the first application needs to be hosted on the other application. For another example, the emergency trigger condition may include that a quantity of idle resources of the second virtual machine is greater than or equal to a maximum quantity of resources required to run the first application on the second virtual machine. The maximum quantity of resources required to run the first application on the second virtual machine is equal to a maximum quantity of resources required to run the first application itself on the second virtual machine when the first application does not need to be hosted on another application. The maximum quantity of resources required to run the first application on the second virtual machine is equal to a maximum quantity of resources for running another application on which the first application needs to be hosted on the second virtual machine plus a maximum quantity of resources required to run the first application itself on the second virtual machine when the first application needs to be hosted on the other application. For another example, the emergency trigger condition may include that a quantity of idle resources of the second virtual machine is greater than or equal to an average quantity of resources required to run the first application on the second virtual machine. The average quantity of resources required to run the first application on the second virtual machine is equal to an average quantity of resources required to run the first application itself on the second virtual machine when the first application does not need to be hosted on another application. The average quantity of resources required to run the first application on the second virtual machine is equal to an average quantity of resources for running another application on which the first application needs to be hosted on the second virtual machine plus an average quantity of resources required to run the first application itself on the second virtual machine when the first application needs to be hosted on the other application.

It may be seen that, in the solution of this embodiment, an emergency policy between a first application and a second application is introduced, and based on the emergency policy, it may be implemented that a second virtual machine on which the second application is hosted temporarily lends a resource to a first virtual machine on which the first application is hosted. Therefore, a new virtual machine may be created only when a working state of the first virtual machine satisfies a condition for adding a virtual machine. Compared with the prior-art mechanism in which a standby virtual machine is created in advance when an application is deployed, the solution of this embodiment helps improve a utilization rate of virtual machine resources because no standby virtual machine needs to be created in advance. Moreover, a temporary resource lending mechanism between virtual machines may be introduced when a working state of a first virtual machine satisfies a condition for adding a virtual machine. Therefore, an emergency virtual machine may temporarily share processing load of a first application running on the first virtual machine before a newly created standby virtual machine is deployed. This helps greatly reduce service fluctuation caused in a procedure of newly creating a standby virtual machine, and helps improve reliability of a cloud service.

An embodiment of the present disclosure further provides a computer storage medium, where the computer storage medium may store a program. When the program is executed, some or all of the steps in any cloud application processing method recorded in the foregoing method embodiments are included.

An embodiment of the present disclosure further provides another computer storage medium, where the computer storage medium may store a program. When the program is executed, some or all of the steps in any cloud application deployment method recorded in the foregoing method embodiments are included.

In the foregoing embodiments, the descriptions of the embodiments have respective focuses. For a part that is not described in detail in an embodiment, reference may be made to related descriptions in other embodiments.

It should be noted that, for ease of description, the foregoing method embodiments are expressed as a series of actions. However, persons skilled in the art should know that the present disclosure is not limited to the described action sequence, because according to the present disclosure, some steps may be performed in other sequences or performed simultaneously. In addition, persons skilled in the art should also know that all the embodiments described in the specification are exemplary embodiments, and the related actions and modules are not necessarily mandatory to the present disclosure.

In the several embodiments provided in the present application, it should be understood that the disclosed apparatuses may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device, and may be a processor in a computer device) to perform all or a part of the steps of the foregoing methods described in the embodiments of the present disclosure. The foregoing storage medium includes any medium that may store program code, such as a universal serial bus (USB) flash drive, a removable hard disk, a magnetic disk, an optical disc, a ROM, or a RAM.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A cloud service provider (CSP) server, comprising:
a processor; and
a memory coupled to the processor and configured to store a code, the processor, by calling the code in the memory, being configured to:
receive an application deployment request comprising:
an emergency policy corresponding to a first application, the emergency policy describing that the first application and a second application have an emergency relationship; and
a host-on relationship template that describes a host-on relationship between the first application and a third application, the host-on relationship being either that the first application is hosted on the third application or the first application and the third application are mutually hosted on each other;
determine that a working state of a first virtual machine satisfies a condition for adding a virtual machine;
determine, according to the emergency policy corresponding to the first application running on the first virtual machine, the second application that has the emergency relationship with the first application;

deploy, on a second virtual machine, the third application that has the host-on relationship with the first application;

instruct the second virtual machine on which the second application is hosted to run the first application deployed on the second virtual machine;

create a third virtual machine;

deploy and start the first application on the third virtual machine; and instruct the second virtual machine to stop running the first application after the first application is started on the third virtual machine.

2. The CSP server of claim 1, wherein the condition for adding the virtual machine comprises the condition that a resource utilization rate of the first virtual machine exceeds a first threshold.

3. The CSP server of claim 2, wherein by calling the code in the memory, the processor is further configured to receive the application deployment request before determining the second application that has the emergency relationship with the first application, the application deployment request further comprises the emergency policy corresponding to the first application, and the emergency policy describes that the first application and the second application have the emergency relationship.

4. The CSP server of claim 1, wherein the condition for adding the virtual machine comprises the condition that a throughput per unit time of the first application running on the first virtual machine exceeds a second threshold.

5. The CSP server of claim 1, wherein the condition for adding the virtual machine comprises the condition that a response latency of the first application running on the first virtual machine exceeds a third threshold.

6. The CSP server of claim 1, wherein by calling the code in the memory, the processor is further configured to receive the application deployment request before determining the second application that has the emergency relationship with the first application, the application deployment request further comprises the emergency policy corresponding to the first application, and the emergency policy describes that the first application and the second application have the emergency relationship.

7. A cloud application processing method, comprising:
receiving, by a cloud service provider (CSP) server, an application deployment request comprising:
an emergency policy corresponding to a first application, the emergency policy describing that the first application and a second application have an emergency relationship; and
a host-on relationship template that describes a host-on relationship between the first application and a third application, the host-on relationship being either the first application is hosted on the third application or the first application and the third application are mutually hosted on each other;

determining, by the CSP server, that a working state of a first virtual machine satisfies a condition for adding a virtual machine;

determining, according to the emergency policy corresponding to the first application running on the first virtual machine, the second application that has the emergency relationship with the first application;

deploying, by the CSP server, on a second virtual machine, the third application that has the host-on relationship with the first application;

instructing the second virtual machine on which the second application is hosted to run the first application deployed on the second virtual machine;

creating a third virtual machine;

deploying and starting the first application on the third virtual machine; and instructing the second virtual machine to stop running the first application after the first application is started on the third virtual machine.

8. The method of claim 7, wherein the condition for adding the virtual machine comprises the condition that a resource utilization rate of the first virtual machine exceeds a first threshold.

9. The method of claim 7, wherein the condition for adding the virtual machine comprises the condition that a throughput per unit time of the first application running on the first virtual machine exceeds a second threshold.

10. The method of claim 7, wherein the condition for adding the virtual machine comprises the condition that a response latency of the first application running on the first virtual machine exceeds a third threshold.

11. The method of claim 7, wherein the emergency policy further comprises an emergency trigger condition, the method further comprises determining, according to a running state of the second virtual machine, that the emergency trigger condition is satisfied before instructing the second virtual machine on which the second application is hosted to run the first application deployed on the second virtual machine, and the emergency trigger condition comprises that a quantity of idle resources of the second virtual machine is greater than to a minimum quantity of resources required to run the first application on the second virtual machine.

12. The method of claim 7, wherein before instructing the second virtual machine on which the second application is hosted to run the first application deployed on the second virtual machine, the method further comprises:
determining that the second virtual machine has sufficient idle resources for deploying the first application; and
deploying the first application on the second virtual machine.

* * * * *